(12) United States Patent
Frahm, II

(10) Patent No.: US 9,303,777 B2
(45) Date of Patent: Apr. 5, 2016

(54) PRESSURE LIMITING VALVE AND ALTERNATIVE METHOD FOR TESTING A BACKFLOW PREVENTER USING THE SAME

(71) Applicant: Lawrence L. Frahm, II, Newbury Park, CA (US)

(72) Inventor: Lawrence L. Frahm, II, Newbury Park, CA (US)

( * ) Notice: Subject to any disclaimer, the term of this patent is extended or adjusted under 35 U.S.C. 154(b) by 0 days.

(21) Appl. No.: 14/679,980

(22) Filed: Apr. 6, 2015

(65) Prior Publication Data

US 2015/0211648 A1 Jul. 30, 2015

Related U.S. Application Data

(63) Continuation of application No. 13/442,200, filed on Apr. 9, 2012, now Pat. No. 9,091,360.

(51) Int. Cl.
| | |
|---|---|
| *F16K 31/12* | (2006.01) |
| *F16K 15/06* | (2006.01) |
| *F16K 37/00* | (2006.01) |
| *F16K 7/12* | (2006.01) |
| *F16K 17/28* | (2006.01) |

(52) U.S. Cl.
CPC ............... *F16K 15/066* (2013.01); *F16K 7/12* (2013.01); *F16K 17/28* (2013.01); *F16K 37/0091* (2013.01); *Y10T 137/0379* (2015.04); *Y10T 137/7793* (2015.04); *Y10T 137/7826* (2015.04)

(58) Field of Classification Search
CPC .................. Y10T 137/7804; Y10T 137/7796; Y10T 137/7801; Y10T 137/782; Y10T 137/7823; F16K 15/066; F16K 37/0091; F16K 7/12

USPC .................................................. 137/505-510
See application file for complete search history.

(56) References Cited

U.S. PATENT DOCUMENTS

| | | | | |
|---|---|---|---|---|
| 2,189,750 | A * | 2/1940 | Barge | 73/254 |
| 2,301,031 | A * | 11/1942 | Ferguson | 92/43 |
| 2,720,887 | A * | 10/1955 | Safford | 137/116.5 |
| 3,162,048 | A * | 12/1964 | Albertson et al. | 73/756 |
| 3,270,557 | A | 9/1966 | McClocklin | |
| 3,886,968 | A | 6/1975 | Murrell | |
| 4,043,357 | A * | 8/1977 | Gocke | 137/495 |
| 4,384,591 | A | 5/1983 | Tan | |
| 4,733,919 | A | 3/1988 | Jacobs et al. | |
| 4,998,557 | A | 3/1991 | Koechlein et al. | |
| 5,048,329 | A | 9/1991 | Marchini | |

(Continued)

FOREIGN PATENT DOCUMENTS

GB 1502124 2/1978

*Primary Examiner* — Jessica Cahill
(74) *Attorney, Agent, or Firm* — Lowry Blixseth LLP; Scott M. Lowry

(57) ABSTRACT

The pressure limiting valve has a low pressure gauge configured to measure the operability of a backflow prevention device having a line pressure relatively higher than the maximum PSI rating of the low pressure gauge. The valve body has an inlet statically coupled to a pressurized fluid source and an outlet coupled to the low pressure gauge. Upper and lower chambers fluidly coupled via a conduit are formed from an interior portion of the valve body and generally separated by a flexible diaphragm. A spring actuable via movement of the flexible diaphragm in response to pressure changes in the valve body biases a closure seat in an open position relative to the outlet when the valve body is not under pressure, and compresses under pressure to permit the closure seat to seal the outlet when pressure in the valve body reaches a maximum PSI rating of the low pressure gauge.

28 Claims, 21 Drawing Sheets

(56) References Cited

U.S. PATENT DOCUMENTS

| | | |
|---|---|---|
| 5,123,436 A | 6/1992 | Koechlein et al. |
| 5,566,704 A | 10/1996 | Ackroyd et al. |
| 5,711,340 A * | 1/1998 | Gusky et al. ............... 137/68.19 |
| 5,713,240 A | 2/1998 | Engelmann |
| 5,722,454 A * | 3/1998 | Smith et al. .................. 137/503 |
| 5,904,334 A | 5/1999 | Grunert et al. |
| 6,325,090 B1 | 12/2001 | Horne et al. |
| 6,354,562 B1 | 3/2002 | Fukano et al. |
| 6,675,110 B2 | 1/2004 | Engelmann |
| 6,705,173 B1 | 3/2004 | Elberson |
| 6,722,388 B1 * | 4/2004 | McAden ................... 137/454.5 |
| 2003/0066562 A1 * | 4/2003 | Wakeman .................... 137/505 |
| 2008/0116409 A1 | 5/2008 | Vaz De Azevedo |
| 2011/0118881 A1 | 5/2011 | Tai |
| 2011/0232780 A1 * | 9/2011 | Arnott ......................... 137/505 |

* cited by examiner

PRESSURE LIMITING VALVE AND ALTERNATIVE METHOD FOR TESTING A BACKFLOW PREVENTER USING THE SAME

BACKGROUND OF THE INVENTION

The present invention relates to a pressure limiting valve and related method for testing the operability of a backflow preventer. More specifically, the present invention relates to a pressure limiting valve with opposing springs that limits the pressure of fluid deliverable to a low pressure gauge in applications for testing the operability of a backflow preventer having one or more check or relief valves located on high or low pressure systems.

For decades, there have been local, state and federal health and safety regulations requiring the installation of valves known as backflow prevention devices on potable and non-potable water systems. The purpose of the backflow prevention device is to protect the main water distribution system from contamination or pollution that may originate from liquid backflow from lines attached to the distribution system as a result of very low or negative pressures. Normally, liquid in a water supply system is maintained at a significant pressure to enable water to flow from the source to a tap (e.g., a faucet), shower, etc. When the pressure in the connecting pipes falls significantly or becomes negative (i.e., reverses), contaminated water from the ground or other storage sources may be drawn into or back through the pipe toward the distribution center. Pressurized water distribution systems known in the art have been known to experience such significant pressure reductions or pressure reversals as a result of water main bursts, freezing pipes or an unexpectedly high demand on the water system, such as can be common when fighting large wild fires in urban areas of Southern California. The backflow prevention devices are designed to prevent contamination of the potable water system. Typically, backflow prevention devices required by law must be installed in accordance with plumbing and/or building codes and must be tested for operation each year.

Typical backflow prevention devices will make use of either an air gap or a mechanical backflow prevention assembly, such as a check valve, between the water delivery point (e.g., the faucet or shower) and the mains water or local water supply. In the United States, the Environmental Protection Agency ("EPA") regulates the contaminants and the associated maximum containment level (MCLS) of local drinking supplies. For example, the National Primary Drinking Water Regulations (NPDWRs or Primary Standards) are enforceable regulatory standards that apply to public water systems. Primary Standards protect public health by limiting the levels of contaminants in drinking water. As a result, in order to maintain levels of contaminants that conform to the Primary Standards, the viability of the backflow prevention device must be tested (typically annually). For a system that includes a check valve, for example, the backflow prevention device may include a series of test cocks and shut-off valves that need annual testing.

The Cross-Connection Control Manual, the contents of which are herein incorporated by reference in their entirety, was first printed nearly forty years ago and is part of a safety program that provides guidelines for products, product performance, installations, training and testing of backflow prevention devices. Environmental Protection Agency, Office of Water, *Cross-Connection Control Manual* (1973, Reprinted in 2003 with Technical Corrections). Related laws and regulations, standard underwriters and the EPA, which publishes the Cross-Connection Control Manual, require certain backflow safeguards discussed in detail in the Cross-Connection Control Manual. These regulations and guidelines are designed to protect public health from unsafe drinking water from backflow in unprotected water systems or from backflow in cross-connections of potable water lines with non-potable water lines. As such, backflow prevention devices are typically required to be installed along some portion of the piping system to prevent unwanted contamination from entering the system due to a low or reverse pressure environment. As such, to ensure the backflow prevention devices are operating properly and efficiently (at least to within predefined specifications), the Cross-Connection Control Manual calls for the use of backflow prevention devices that have some method of being tested. Testing ensures that the devices perform at predetermined performance specifications under hydraulic conditions. For example, testing would reveal that a simple check valve is not reliable to hold drip-tight over time. Thus, there has been a need for more sophisticated valves that hold tighter seals for longer durations in preventing reverse flow in distribution systems.

In general, the Cross-Connection Control Manual categorizes most backflow prevention devices into four basic configurations that include: (1) Double Check Valve Assemblies, also known as ("DC") assemblies; (2) Reduced Pressure Principle Assemblies, also known as ("RP") assemblies; (3) Pressure Vacuum Breaker Assemblies ("PVB"); and (4) Spill Resistant Pressure Vacuum Breaker Assemblies ("SVB").

A double check valve assembly (DC) essentially includes two single check valves coupled in series within one body. The body typically includes a series of test cocks and a pair of shut-off valves at each end of the assembly. The test cocks provide the ability to determine whether either or both of the check valves are operating within predefined pressure ranges, or completely inoperative altogether (unable to hold a positive back pressure). Each check valve is spring loaded such that some predetermined amount of pressure must exist (e.g., one pound or more) to open the valves. Double check valve combinations of this nature are typically used to protect against low to medium hazard conditions and may be used under continuous pressure to protect against both back-siphonage and backpressure conditions.

A reduced pressure principle assembly backflow preventer is essentially a modified double check valve assembly. In this respect, the (RP) assembly includes two check valves, as mentioned above, with a relief vent valve placed therebetween. The pressure of the liquid disposed between the two check valves is preferably kept at a pressure of at least five pounds less than the pressure of the incoming supply. In the event the pressure between the two check valves decreases beyond a predetermined threshold (e.g., the aforementioned five pounds), the relief valve opens to allow air into the backflow device stopping back-siphonage between the two check valves when the pressure drops to about approximately two PSI. As such, the (RP) assembly typically provides better protection from back-siphonage and low pressure conditions than the (DC) assembly described above. The (RP) assembly can protect against back-siphonage and low pressure when both the first and second check valves become fouled. Additionally, this device can be used under constant pressure and at high hazard installations. Of course, each device includes test cocks and shut-off valves for testing—notably, to ensure the proper pressure drop between points of interest.

Alternatively, pressure vacuum breakers (PVB) developed as a result of a need for an atmospheric inlet valve that could be utilized under constant pressure and that could be tested inline. The (PVB) includes a spring that sits on top of a disc or float assembly with two shut-off valves and a series of test cocks. (PVB) assemblies also include a single check valve. When pressure decreases to a pre-set point, the air inlet valve opens. One drawback of the (PVB) assemblies is that they are not designed to protect against backpressure conditions. As a result, the installation must be a minimum of 12 inches higher than all downstream usages.

The spill resistant pressure vacuum breaker (SVB) is essentially a modification to the (PVB) assembly, wherein the (SVB) is designed to minimize water spillage. Installation and backpressure requirements of the (PVB) and (SVB) are similar to one another and both devices are recommended for limited usage.

All of the check valves on all of the backflow assemblies are designed to close in the event of a significant pressure drop or pressure reversal in the supply line. In this respect, a spring loaded check valve has a predetermined tension that requires a certain amount of flow to be exerted thereon to remain open. If certain flow conditions exist within the piping system (e.g., low flow or reverse flow), the spring overcomes the flow in the piping system and the check valve closes. In a closed condition, water is not allowed to flow backward from the outlet toward the distribution center. Additionally, a relief valve or float valve opened to the atmosphere may be activated under other conditions in the event pressure in the system drops to a present opening point, to introduce air into the system to prevent back-siphoning conditions or unsafe operating conditions. A leaking check valve or stuck relief/vent valve, may fail to open in the event of a pressure drop or pressure reversal causing unsafe operating conditions. Check valves and relief/vent valves must be periodically tested to ensure that they are in adequate operating condition. Faulty check or relief, vent valves of this nature present the same problems identified above with a system that does not include a means to prevent backflow.

All backflow assemblies are designed to have very low pressure loss when installed on distribution systems, so check valves will only have one to five PSI pound spring loads.

All backflow prevention assemblies are designed to product performance standards and once a year they must be tested using pressure gauges to determine if the assemblies are still performing to the standards in which they were designed.

All backflow prevention assemblies are tested in descending pressure readings, and never in ascending readings as in their product design. Pressure gauges were initially used to test the operability of the backflow assembly as a means for indicating if there is a check valve leakage within the backflow assembly. Of course, pressure gauges have a variety of pressure range capacities and reading accuracies. Normally, a pressure gauge should be selected based on the desired minimum resolution (i.e., the lowest readable pressure range increment). For example, a gauge that can record readings upwards of 500 PSI will not be able to read increments to the same accuracy as a lower pressure 15 PSI gauge if you are only interested in readings in low pressure ranges (i.e., 15 to zero PSI). The minimum increment of the 500 PSI gauge may be as low as 10 PSI while the minimum increment of the 15 PSI gauge can be as low as a half of a tenth PSI (i.e., 0.05 PSI). All backflow preventers are tested in the pressure range of 15 PSI to zero PSI even though they may be located on systems that have pressures over two hundred pounds. When testing a check valve on a backflow assembly, the only interest is whether it holds drip tight above one PSI (1.0 PSI). At one PSI, there is no possibility of a backflow condition.

There are many instances when a gauge is used for testing water or liquid distribution systems where the line pressure may not be known before the gauge is installed. A gauge installed on a distribution system having a line pressure that far exceeds the maximum PSI rating of the gauge, will more than likely destroy the gauge. At a minimum, it can be expected that the accuracy of the gauge will be significantly adversely affected. This is a common problem, for example, when there is a need to test the function of a valve coupled to a water system that has a high input water pressure (e.g., around 200 PSI), but there is a need to check if the valve closes drip tight by measuring pressures under 15 PSI (e.g., in the 1-2 PSI range at 0.05 to 0.1 PSI increments).

So, until now, there has been no equipment for attaching a low pressure gauge to a high pressure system without damaging the low pressure gauge. As a result, differential pressure gauges became the gauge of choice because of their capability of measuring differential pressures to 1 or 2 tenths PSI in a high pressure water system. In this respect, it would be possible to measure the pressure drop across one or more check valves integrated as part of a backflow prevention device in a high pressure line. In fact, some differential pressure gauges are designed to read pressures in the 0-15 P.S.I.D. range and can be connected to a water system that has pressures above 200 PSI, all without destroying the gauge. Despite being frequently used to perform testing of check valve operability, differential pressure gauges do have several major drawbacks, especially when used incorrectly. Differential pressure gauges are designed to read differential pressures and not line pressures. When a differential pressure gauge is attached to a pressure system pressurizing only the high side, the gauge may be damaged such that the gauge may no longer be able to read pressure differentials to the requisite resolution and accuracy.

As a result, the four types of backflow prevention devices mentioned above require an elaborate process for testing check valves. This is due, in part, to the flow through design of the differential pressure gauge, which comes in two valve, three valve, and five valve configurations. For example, U.S. Pat. No. 5,566,704 to Ackroyd discloses a method for using a differential pressure gauge to test the performance of the check valves in a backflow preventer. But, this process is complex and requires bleeding all of the air out of each test cock on the backflow preventer. In fact, all differential pressure gauges approved for testing backflow prevention devices must have the capability of bleeding all the air out of the test equipment because the gauge must be capable of performing the test under hydraulic conditions. The differential pressure gauge must be able to read pressure differentials as low as one tenth (0.1) to two tenths (0.2) PSI on the test equipment scale plate. The check valve of a backflow prevention device must hold one pound of pressure in either direction of flow. A check valve that reads one (1.0) PSI or higher is reported on a test form as holding tight. But, if the check valve gives the tester a reading of 0.9 PSI, one tenth of a pound below the one pound minimum requirement, then the check valve is recorded as failed. If the differential pressure gauge goes to zero, then the check valve is recorded as leaking.

The Cross-Connection Control Manual endeavors to standardize the testing procedure for backflow preventers. The variety of valves, quantity of hoses on models of testing equipment, and a variety of other factors cause confusion and interject errors into the testing process that can lead to inaccurate and/or inconsistent testing results. The industry started testing backflow preventers using only the high side of a 0-15 PSI rated differential pressure gauge not realizing that the gauge accuracy is affected by this simplified testing method. Over time, the spring in the differential pressure gauge wears and loses tension. Most rubber diaphragm differential pressure gauges have a span adjustment screw located on the low pressure side where the spring is located. Tightening the screw replaces the lost tension in the spring. Accordingly, adjusting the screw allows the gauge to be calibrated back to zero when no pressure is present. On one hand, this helps ensure the accuracy of the testing equipment. Although, on the other hand, unless the differential pressure gauge is checked before use, measurements may read high in the event the calibrated adjustment is not made prior to conducting the test. If the differential pressure gauge is used only for pressurizing the high side, then spring tension memory loss is accelerated.

It is typically not recommended to use the differential pressure gauge in the manner described above because of the over-ranging that is taking place with respect to the spring. In fact, the spring can start losing memory immediately after calibration. Additionally, high line pressure and water hammer are two of the most common issues that affect gauge accuracy. In view that one tenth (0.1) PSI has been established as the minimum pressure change increment for determining whether a check valve passes or fails a test, having a gauge that is susceptible to immediate memory loss (resulting in high readings) undoubtedly makes it nearly impossible to use these gauges to accurately test the proper operation of the backflow prevention device.

As such, the state of the art is devoid of prior art that is able to incorporate a low pressure gauge having a minimum PSI rating far below the line pressure, that is capable of measuring relatively small pressure increments. One prior art reference, for example, U.S. Pat. No. 6,705,173 to Elberson discloses an air flow rate meter capable of measuring relative pressure changes with a low-pressure gauge (rated at 0-3 PSI) connected in-line in a high pressure system (e.g., 100-130 PSI). The Elberson pressure gauge is designed to monitor the flow of air in a high-pressure compressed air system. The low pressure gauge is contained within a sealed, high pressure body connected to the high-pressure compressed air line. The low pressure gauge pneumatically connects to opposite ends of a tube disposed within the meter through which the main air pressure line flows. The gauge measures a pressure drop across a restricted orifice defined by the tube. Importantly, the air flow rate meter design protects the low-pressure gauge from being exposed to pressures that exceed the rating of the gauge—pressures that may otherwise damage or permanently destroy the low-pressure gauge.

But, the Elberson air flow rate meter can only be used with air or gas, and not hydraulic fluids. More specifically, the Elberson air flow rate meter is not designed to measure static pressure in a system (e.g., above ten PSI) or the pressure gauge will be severely damaged. Rather, the rate meter is designed only to measure the pressure drop across a particular point of air flowing by a certain throttle. As such, Elberson is an air flow monitor and not a pressure limiting valve that can be utilized with several thousand pounds of pressure. In essence, the Elberson monitor only works if there is a continuous flow through a constricted venturi passage, which creates a differential pressure. The Elberson device cannot work in a static environment, such as in the testing of backflow prevention devices, because there is no continuous flow.

In fact, several other prior art references that disclose high and low pressure gauges do not operate in a static environment. For example, U.S. Pat. No. 3,270,557 to McClocklin discloses a hydraulic circuit tester having a low pressure gauge and a high pressure gauge, but the pressure gauges are not designed to measure static pressure. Specifically, McClocklin discloses a main flow passage having a flow meter disposed therein that measures the flow rate of liquid flowing through the hydraulic circuit tester. A secondary passage diverts liquid from the main passage to a transversely extending passage having a high pressure branch and a low pressure branch connected to high and low pressure gauges, respectively. The low pressure branch includes a valve closure member biased in an open position by a spring and is disposed upstream of the low pressure gauge. When the pressure flowing through the McClocklin device is less than the maximum pressure of the low pressure gauge, liquid flows around the valve closure member, through a slot, and into the low pressure gauge. The liquid delivered to the low pressure gauge then flows into a recess behind the valve closure member and through a series of passageways back to the main flow passage, where the water exits the unit. If the pressure in the device exceeds the rating of the low pressure gauge, the valve member closes, thereby blocking liquid flow to the low pressure gauge. In this respect, the McClocklin device measures dynamic pressure, not static pressure, because liquid flows through device while the pressure is measured.

GB Patent No. 1,502,124 to Collins discloses a pressure regulator that reduces the pressure of gas delivered to an oxygen mask or welding torch from a relatively higher pressure source, but does not measure static pressure. More specifically, the Collins device includes a high pressure chamber that receives high pressure gas from the source and a low pressure chamber that delivers low pressure gas to the welding torch or oxygen mask. A valve stem actuated by a string-supported diaphragm moves relative to a valve seat to control the pressure of the gas delivered to the low pressure chamber. The diaphragm moves the valve stem closer to the valve seat to reduce the pressure of the gas in the low pressure chamber if the pressure in the low pressure chamber is too high. Conversely, the diaphragm moves the valve stem away from the valve seat to increase the pressure of the gas flowing into the low pressure chamber if the pressure in the low pressure chamber becomes too low. Collins also discloses high and low pressure gauges that measure the pressures in the high and low pressure chambers, respectively. Importantly, however, Collins measures dynamic pressure with the high and low pressure gauges in the high and low pressure chambers, respectively, as gas flows through the Collins device; and not as static pressure.

The prior art also includes several devices that seek to control the flow rate or pressure of a fluid. But, in addition to not measuring the fluid pressure therein, these devices control dynamic fluids, not static fluids. For example, U.S. Pat. No. 3,886,968 to Murrell discloses a flow control device that provides a substantially constant flow in the presence of varying inlet pressures and downstream load conditions. More specifically, Murrell discloses a diaphragm dividing a circular casing into upper and lower chambers. A coil spring is disposed between the casing and the diaphragm in the upper chamber. The casing includes an inlet that provides fluid to both the upper and lower chambers and an outlet that allows fluid to exit the upper chamber. The diaphragm includes a valve member integrally disposed thereon that moves relative to a valve seat on the outlet as the diaphragm moves up and down in response to pressure differentials between the upper and lower chambers. As such, the proximity of the valve member to the valve seat determines the volume of fluid flowing through the device. Consequently, Murrell controls the flow rate of a dynamic fluid; and does not measure the pressure of a static liquid.

U.S. Pat. No. 4,733,919 to Jacobs discloses an integrated pneumatic pressure exhaust valve and fluid coupling for tractor trailer air brake systems. But, this device is only operable with dynamic gases (e.g., air that actuates brakes). More specifically, Jacobs discloses a hollow body having an inlet port, an exhaust opening generally coaxial with the inlet port, and an outlet port disposed at a generally right angle relative to the inlet port and the exhaust opening. The inlet port includes a membrane having multiple apertures therein and the exhaust opening includes a frusto-conical plug also having multiple apertures therein. A flexible diaphragm is positioned between the plug and the membrane such that the diaphragm blocks any air from flowing through the apertures in both the membrane and plug when no air pressure is applied to the brakes. When the driver applies the air brakes, the pressure in the inlet port forces the diaphragm against the plug. The outer edges of the diaphragm deflect against the angled sides of the frusto-conical plug, thereby allowing air to flow from the inlet port through the apertures in the membrane and into the outlet port for eventual delivery to the brakes. When the driver releases the brakes, the pressure on the inlet side of the diaphragm becomes significantly lower than the pressure on outlet side thereof. In this respect, the diaphragm deflects forwardly against the membrane and blocks the apertures therein. This deflection opens a flow path between the outlet port and the exhaust opening, thereby allowing the high pressure air in the outlet port to vent into the atmosphere via the apertures in the plug. In this respect, the Jacobs device controls the flow of a dynamic gas and does not otherwise measure the pressure of a static liquid.

Thus, there exists a significant need for a pressure limiting valve usable for testing a pressure drop across a check or relief valve incorporated into a backflow preventer, a pressure drop that is relatively significantly lower than the line pressure along which the backflow preventer serves. Such a pressure limiting valve preferably includes a single inlet pressure limiting valve having means for protecting a low pressure gauge attached thereto for measuring the pressure drop. The valve includes an upper and a lower chamber generally separated by a flexible rubber diaphragm, yet fluidly coupled by a conduit, a spring actuable via movement of the flexible diaphragm in response to pressure changes in the valve body to generally bias a closure seat in an open position relative to the outlet when the valve body is not under pressure and facilitate compression to permit the closure seat to seal the outlet when pressure in the valve body approximately reaches a maximum PSI rating of the low pressure gauge. The present invention fulfills these needs and provides further related advantages.

SUMMARY OF THE INVENTION

The pressure limiting valve disclosed herein includes a low pressure gauge configured to measure the operability of a backflow preventer having a line pressure relatively higher than the maximum rating of the low pressure gauge. As such, the pressure limiting valve includes a valve body having an inlet configured to statically couple to the backflow preventer and an outlet configured to couple to the low pressure gauge. An upper and a lower chamber are formed from an interior portion of the valve body and are generally separated by a flexible rubber diaphragm. Although, a conduit fluidly couples the upper and lower chambers. Furthermore, the valve includes a spring actuable via movement of the flexible diaphragm in response to pressure changes in the valve body. The spring generally biases a closure disc in an open position relative to the outlet when the valve body is not under pressure. Alternatively, the spring compresses under pressure to permit the closure disc to seal the outlet when pressure in the valve body approximately reaches a maximum PSI rating of the low pressure gauge, thereby limiting the maximum pressure deliverable to the low pressure gauge.

The valve may additionally include a preferable seat positioned near the outlet and generally tapering downwardly away from the diaphragm to permit deflection of the closure disc thereover. A stem may be biased between the spring and a disc retainer and generally extend into a vertical passageway at least partially circumscribed by the seat. Furthermore, a diaphragm retainer may be disposed across at least a portion of the planar surface of the diaphragm and be influenced by movement of the spring. In an alternative embodiment, the spring may include a pair of opposing springs disposed across opposite portions of the flexible diaphragm in respective upper and lower chambers. In this embodiment, the first spring generally biases the closure disc in an open position relative to the outlet and the second spring is positioned to generally oppose open movement of the closure disc by the first spring. The first spring may include a tensioner coupled thereto for adjusting and fine tuning the maximum pressure deliverable to the low pressure gauge. Preferably, the valve assembly and the line pressure operate with some form of hydraulic fluid source.

To protect the low pressure gauge from over-pressurization, a relief valve having a release point relatively lower than the maximum PSI rating of the low pressure gauge may be fluidly coupled thereto. The valve body may also include a pair of generally oppositely extending arms, wherein the first arm carries relatively high pressure fluid to the high pressure gauge, and the second arm carries relatively low pressure fluid through the outlet to the low pressure gauge. In this respect, the high pressure gauge may be fluidly coupled to the inlet for measuring the line pressure. The valve body may also include a vent coupled to the upper chamber and a needle valve port having a movable stem to selectively fluidly couple the lower chamber to a drain. Of course, the valve body, including the low and high pressure gauges coupled thereto, may be selectively mountable to a portable backboard for transportation to field testing locations.

In an alternative embodiment, the pressure limiting valve has a low pressure gauge configured to measure the operability of a backflow preventer having a line pressure relatively higher than the maximum rating of the low pressure gauge. In this embodiment, the valve similarly includes a valve body having an inlet configured to statically couple to the backflow preventer and an outlet configured to couple to the low pressure gauge. An upper and a lower chamber formed from an interior portion of the valve body are generally separated from one another by a flexible rubber diaphragm, yet fluidly coupled via a conduit. To protect the low pressure gauge from over-pressurization, a relief valve may be fluidly coupled thereto. The relief valve preferably has a release point relatively lower than the maximum PSI rating of the low pressure gauge. Furthermore, a needle valve having a movable stem may selectively fluidly couple the lower chamber to a drain to help pressurize the valve assembly before activating the pressure limiting valve.

In this embodiment, the valve assembly includes a pair of opposing springs disposed across opposite portions of the flexible diaphragm in respective upper and lower chambers. The springs are actuable via movement of the flexible diaphragm in response to pressure changes in the valve body. The first spring generally biases a closure disc in an open position relative to the outlet and the second spring generally opposes open movement of the closure disc by the first spring when the valve is not under pressure. Accordingly, the first spring compresses under pressure to permit the closure disc to seal the outlet when pressure in the valve body approximately reaches a maximum PSI rating of the low pressure gauge. This feature effectively limits the maximum pressure deliverable to the low pressure gauge. A seat positioned near the outlet and generally tapering downwardly away from the diaphragm permits deflection of the closure disc thereover to form a better seal. A diaphragm retainer disposed across at least a portion of the planar surface of the diaphragm and influenced by movement of the first and second springs may additional help facilitate the opening and closing of the outlet.

This embodiment of the pressure limiting valve may further include a stem biased between the first spring and a disc retainer that generally extends into a vertical passageway at least partially circumscribed by the aforementioned seat. The valve body may also include a pair of generally oppositely extending arms, wherein the first arm carries relatively high pressure fluid to the high pressure gauge and the second arm carries relatively low pressure fluid through the outlet to the low pressure gauge. Preferably, the line pressure entering the inlet originates from a hydraulic fluid source. Additionally, a tensioner coupled to the first spring may be used to adjust and fine tune the maximum pressure deliverable to the low pressure gauge. A vent may be further formed from the cap and be fluidly coupled to the upper chamber to relieve pressure out from within the valve body. Lastly, a high pressure gauge is preferably coupled to the second arm and in fluid communication with the inlet for measuring the line pressure.

The related method for testing the operability of a backflow preventer using a single inlet pressure limiting valve having a low pressure gauge for measuring an activation pressure of a check valve and a high pressure gauge for measuring a line pressure coupled to the backflow preventer includes removing air out from within the backflow preventer and a two valve tee coupled thereto by at least establishing a fluid flow out the two valve tee. Next, the two valve tee is coupled to the inlet of the pressure limiting valve while fluid is flowing out from the two valve tee. Residual air is then removed from the pressure limiting valve while the low and high pressure gauges are in fluid communication with a common drain. Next, the low and high pressure gauges are separated from the common drain to activate the pressure limiting valve. Lastly, the backflow preventer is closed to the line pressure and fluid communication of the low and high pressure gauges is reestablished with the common drain to release pressurized fluid from an upstream side of the check valve, wherein the check valve engages at the activation pressure identifiable via readings on the low pressure gauge. In this embodiment, the check valve may include a relief valve.

The method may further include steps for regulating fluid flow from the backflow preventer to the inlet of the pressure limiting valve with the two valve tee. Furthermore, concurrent fluid communication of the low and high pressure gauges with the drain may be regulated through use of a needle valve. The above-described removing step may further include sequentially opening at least a pair of test cocks on the backflow preventer. Furthermore, the closing step may include closing a center valve and an end valve of the two valve tee and a pair of shut-off valves positioned on opposite sides of the check valve. As such, the inlet shut-off valve may be re-opened to expose the high pressure gauge to the line pressure without damaging the low pressure gauge on the other end. Lastly, a hose may be connected to a first test cock on the backflow preventer and the center valve on the two valve tee when the two valve tee is coupled to a second test cock on the backflow preventer. Accordingly, when the center valve is in an open position, the hose by-passes the first shut-off valve.

An alternative method for testing the operability of a backflow (RP) assembly using a single inlet pressure limiting valve having a low pressure gauge for measuring pressure inside a backflow assembly and a high pressure gauge for measuring line pressure coupled to the backflow preventer, includes a two valve tee coupled thereto by establishing a fluid flow out the two valve tee, coupling the two valve tee to the inlet of the pressure limiting valve while fluid is flowing out from the two valve tee, bleeding the pressure limiting valve of residual air while the low and high pressure gauges are in fluid communication with a common drain, separating the low and high pressure gauges from the internal pressure zones to activate the pressure limiting valve, then closing the backflow preventer to the line pressure and opening a bleed valve to release pressurized fluid from inside the pressure limiting valve and the backflow assembly for the initial testing of valves inside the backflow assembly, by activation pressure identifiable via readings on the low pressure gauge.

This alternative method may further include steps for reconnecting the hose from one test cock to the two valve tee, opening the pair of test cocks. Lastly, the bleeding step may further include connecting a hose to a pair of test cocks on the backflow preventer to by-pass a shut-off valve utilizing a two valve tee.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
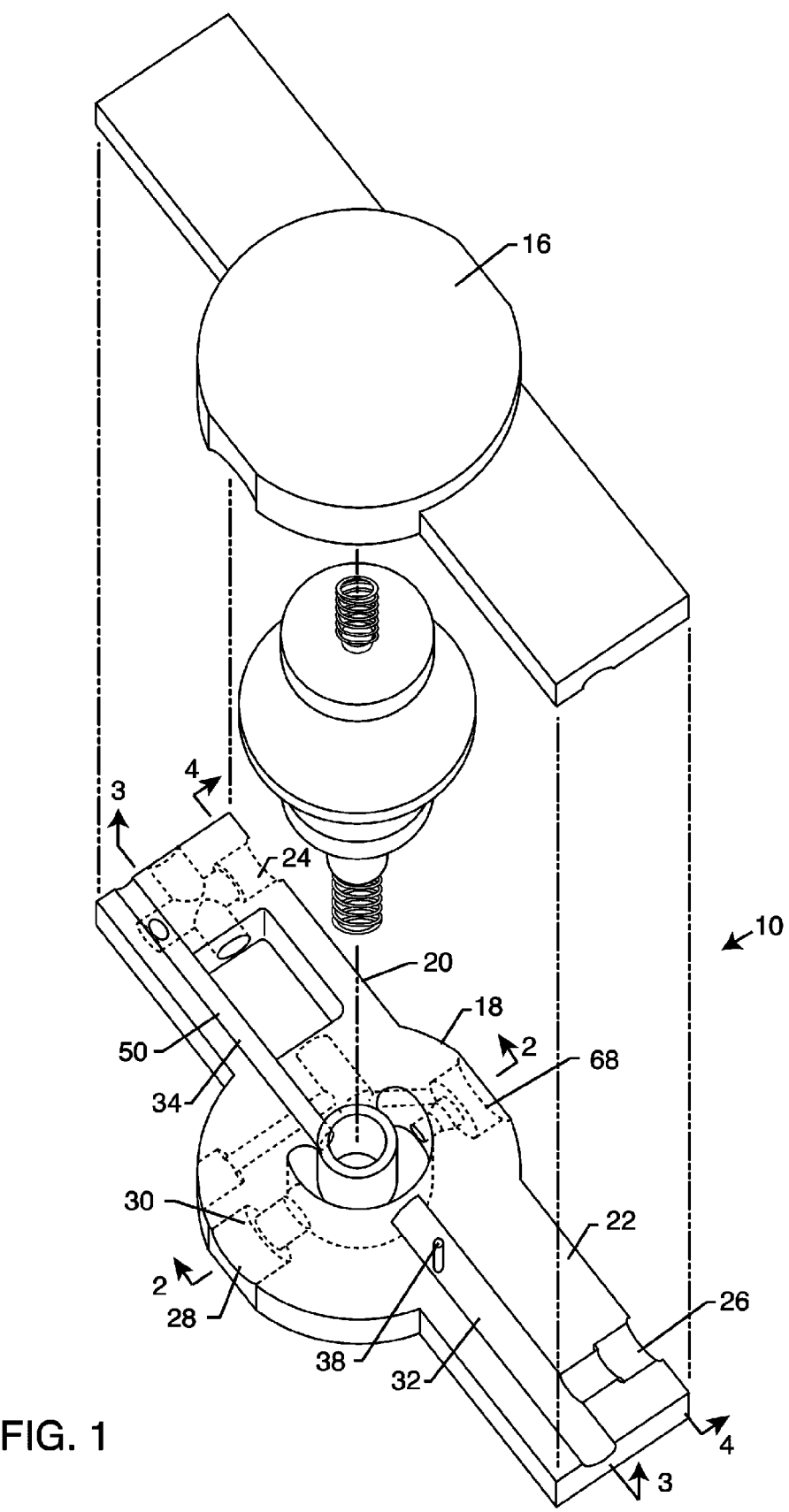
FIG. 1 is a partially fragmented and exploded perspective view of a pressure limiting valve disclosed herein.

As shown in the exemplary drawings for purposes of illustration, the present disclosure for a pressure limiting valve is referred to generally by the reference numeral 10. The valve 10 may be used to protect different types of pressure gauges from over-pressurization, while allowing the pressure gauge to function normally within design operating ranges in either ascending or descending indications. Such a pressure limiting valve 10 incorporates a flexible diaphragm 12 biased between a pair of opposing springs, as generally shown and described in more detail with respect to FIGS. 2 and 4. Problems known in the art with respect to pressure gauges are inaccurate readings and damage resultant from over-pressurization. For example, when testing a backflow prevention device, it is desirable to use a low pressure gauge to take high accuracy readings on an otherwise high pressure system. A well known problem in the art is that the low pressure gauge is subject to damage in the event it is exposed to pressures exceeding its rating. This scenario is a common problem when testing a relatively low pressure drop across a backflow prevention device, when the backflow prevention device is connected inline to a highly pressurized system. The low pressure gauge must be capable of measuring the relatively small pressure drop (e.g., 2-5 PSI) across the backflow prevention device to ensure that the device is operating properly. The problem is that the backflow prevention device is oftentimes connected to a pressurized fluid source having pressures as high as 150+ PSI. Subjecting a low pressure gauge having a maximum 15 PSI rating to a 150+ PSI line would certainly damage, if not completely destroy the gauge. As such, the valve 10 disclosed herein is designed to allow accurate measurement (e.g., 0.1 to 0.2 tenths PSI increments) of the pressure drop across the backflow prevention device while simultaneously preventing damage to the low pressure gauge from the high pressure supply line. In this respect, the valve 10 can also measure the relatively high pressure supply line. The valve 10 in essence allows the low pressure gauge to function normally within its pressure range field without being damaged by the high pressure supply line.

FIG. 1 illustrates a partially fragmented perspective view of the preferred valve 10 having a valve cap 16 that fits over a relatively cylindrical valve body 18 having a low pressure arm 20 and a high pressure arm 22 extending therefrom in opposite directions. The low pressure arm 20 includes a low pressure gauge port 24 configured to couple to a low pressure gauge (not shown in FIG. 1) and the high pressure arm 22 includes a high pressure gauge port 26 configured to couple to a high pressure gauge (also not shown in FIG. 1). Each of the ports 24, 26 includes a mechanism well known in the art to securely couple a pressure gauge thereto for drip tight attachment. The gauges may attach to the ports 24, 26 through threaded attachment, snap-tight attachment, or another mechanical or chemical attachment mechanism known in the art. It is particularly preferred that the gauges non-removably attach to the ports 24, 26 because it is undesirable to swap out or change the gauges.

The valve 10 connects to a main or supply line by an inlet 28 that preferably includes a filter port 30 to prevent unwanted substances (e.g., particulates) from entering the valve 10. The inlet 28 may include one or more connectors known in the art for connecting to a hose or water supply. A high pressure feed tube 32 channels high pressure fluid from the inlet 28 down the high pressure arm 22 and to the high pressure gauge port 26. The high pressure gauge port 26 preferably includes a means for drip-tight connection to one or more high pressure gauges (e.g., rated at 150+ PSI) known in the art. Similarly, a low pressure feed tube 34 channels relatively lower pressure fluid through the valve 10 along the low pressure arm 20 and to the low pressure gauge port 24. The low pressure gauge port 24 is similarly configured to connect to one or more low pressure gauges (e.g., rated at 15 PSI or lower) known in the art. As described in more detail below, the valve 10 regulates the maximum pressure of fluid deliverable to the low pressure gauge port 24. As such, the valve 10 is able to determine the main or supply line pressure of, e.g., a mains water or local water supply, through use of the high pressure gauge connected to the high pressure gauge port 26 and test the operability of a backflow prevention device connected inline along the mains water or local water supply through use of a low pressure gauge connected to the low pressure gauge port 24.

Figure 2:
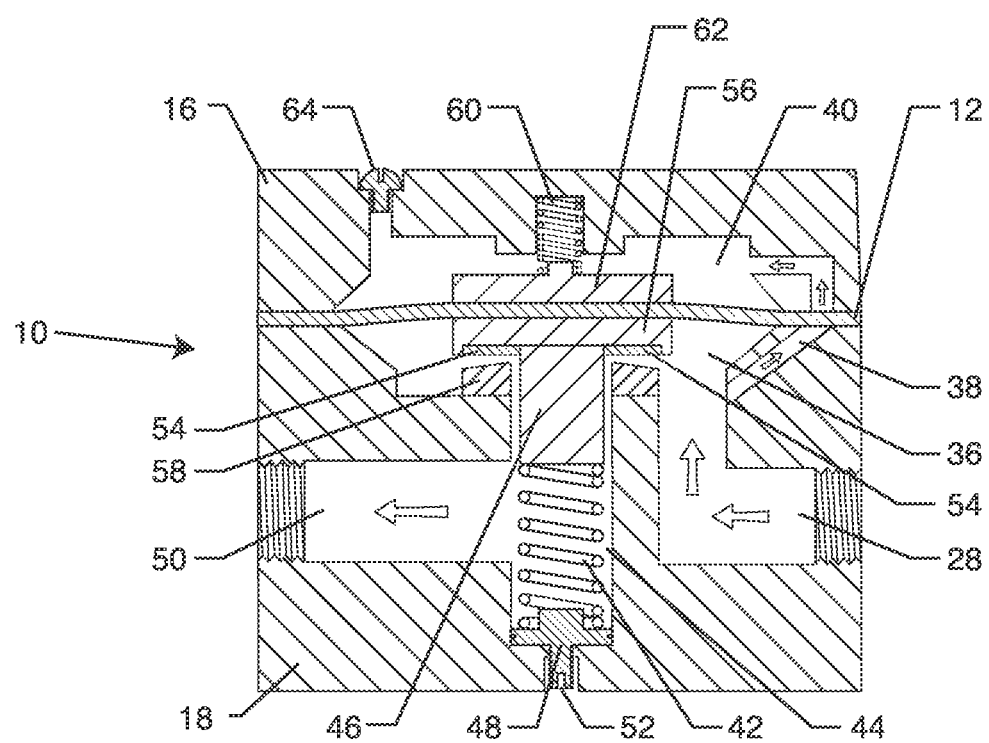
FIG. 2 is a cross-sectional view of the pressure limiting valve, taken about the line 2-2 in FIG. 1.

FIG. 2 is a cross-sectional view of the pressure limiting valve 10, illustrating the internal components thereof. As shown in FIG. 2, fluid enters the valve 10 through the inlet 28 as denoted by the directional arrows nearby. The pressure of the fluid entering the inlet 28 is approximately equal to the line pressure of the local water supply or commercially created pressure. Fluid entering the valve 10 first floods a lower chamber formed from the valve body 18 beneath the diaphragm 12. A conduit 38 couples the lower chamber 36 to an upper chamber 40, formed between the valve cap 16 and the valve body 18, otherwise generally separated by the diaphragm 12. The conduit 38 allows fluid entering through the inlet 28 to flood the lower and upper chambers 36, 40 of the valve assembly 10. The diaphragm 12 preferably comprises a flexible yet resilient material and is positioned such that its planar surface substantially separates the lower chamber 36 from the upper chamber 40. FIG. 2 further illustrates an adjustable main spring 42 that resides within a vertical passageway 44 and generally biases the diaphragm 12 upwardly. The passageway 44 is sized to allow the main spring 42, in this case a coil spring, to move vertically therein depending on the fluid pressure exerted on the flexible diaphragm 12, as described in more detail below. Adjacent an upper portion of the main spring 42 is a main stem 46 positioned substantially within the vertical passageway 44 and subjected to vertical movement therein depending on the compression or extension of the main spring 42. The adjustable main spring 42 is tensioned to bias the main stem 46 upwardly into contact with the diaphragm 12 and out from within the vertical passageway 44. Preferably, the main spring 42 is tensioned to the same or approximately the same poundage as the maximum rating associated with the low pressure gauge connected to the valve 10 via the low pressure gauge port 24 (FIG. 1).

The main spring 42 may include a tensioner 48 positioned in a portion of the vertical passageway 44 extending below the horizontal channel forming an outlet 50. The tensioner 48 has an externally accessible indentation 52 actuable by a screwdriver (e.g., flat head or Phillips head) or comparable device for rotational displacement within the vertical passageway 44. Clockwise rotation of the tensioner 48 causes upward movement thereof to increase the tension against the main spring 42. Such increased tension permits the valve 10 to deliver fluid to the low pressure gauge port 24 at a relatively lower pressure. Alternatively, counter-clockwise rotation of the tensioner 48 causes downward movement thereof to decrease the tension against the main spring 42. Accordingly, such decreased tension lowers the overall resistance in maintaining the vertical passageway 44 in an open position (FIG. 2). The tensioner 48 can, therefore, be utilized to adjust, and preferably fine tune, the tension rating on the main spring 42 to a high degree of accuracy, and preferably to a tolerance of +/−1% of the full range of the main spring 42, to match the maximum gauge indications without over pressurizing the gauge.

The main stem 46 includes a closure disc 54 positioned at an upper end thereof and sandwiched therein by a disc retainer 56. The closure disc 54 is at least of a diameter that encompasses the open portion of the vertical passageway 44 and preferably a diameter that extends out beyond the open vertical passageway 44 to sufficiently overlap with a tapered seat 58 formed around a portion of the outer diameter of said vertical passageway 44. Pressure from the fluid in the pressure limiting valve 10 may cause the closure disc 54 to deflect somewhat downwardly (FIG. 4) against the tapered seat 58 to further ensure the vertical passageway 44 is sealed off when the outlet 50 experiences some threshold maximum output pressure.

Figure 4:
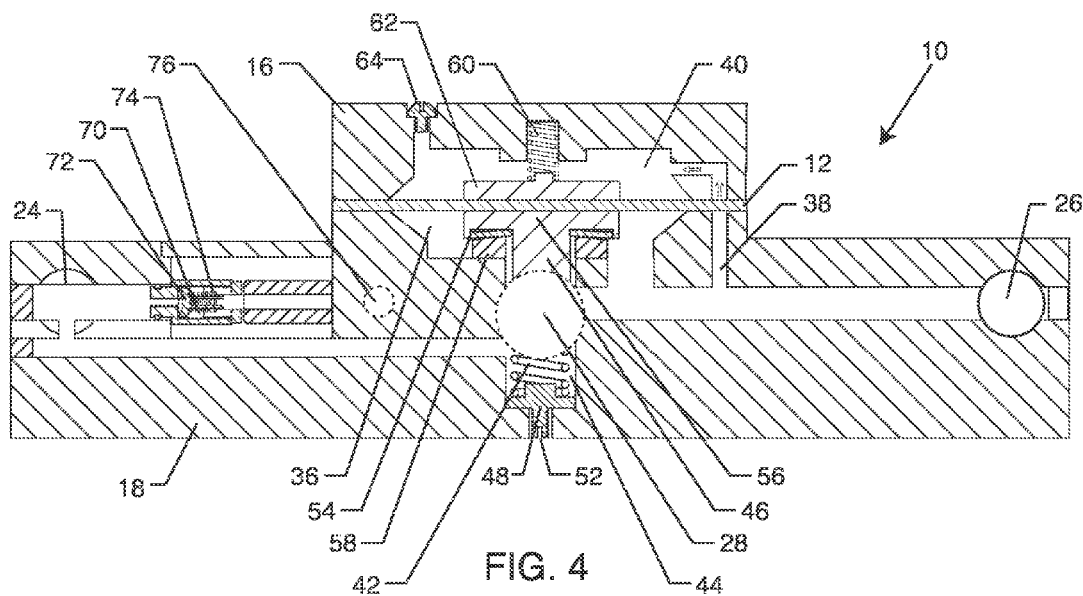
FIG. 4 is an additional cross-sectional view of the pressure limiting valve, taken about the line 4-4 in FIG. 1.

Additionally, FIGS. 2 and 4 illustrate that the upper chamber 40 includes an upper diaphragm spring 60 that helps close the vertical passageway 44 when the pressure on both sides of the diaphragm 12 are equal. The diaphragm spring 60 may be biased against an upper diaphragm retainer 62 having a planar surface complimentary to the planar surface formed by the disc retainer 56 coupled to the main spring 42. A person of ordinary skill in the art will recognize, however, that the surfaces of the diaphragm 12 and the disc retainer 56 and the diaphragm retainer 62 do not necessarily need to be complimentary. When included as shown in FIGS. 2 and 4, the diaphragm 12, the disc retainer 56 and the diaphragm retainer 62 are subject to vertical movement as a result of compression and/or expansion of the main and diaphragm springs 42, 60 resultant from pressure variations in the lower and upper chambers 36, 40. Movement of the springs 42, 60 in response to pressure fluctuations within the lower and upper chambers 36, 40 causes deflection of the diaphragm 12—i.e., the diaphragm 12 deflects upwardly when pressure within the lower and upper chambers 36, 40 decreases and the diaphragm 12 deflects downwardly when pressure within the lower and upper chambers 36, 40 increases. This feature of the valve 10 is particularly important when pressures are slowly rising, thereby potentially forcing the low gauge to read past its maximum pressure indications.

Preferably, when the line pressure within the outlet 50 equals the maximum indicated pressure of the low pressure gauge, the main spring 42 has been sufficiently compressed within the vertical passageway 44 such that the corresponding closure disc 54 engages the upper opening of the vertical passageway 44 to form a fluid-tight seal. Partial deflection of the closure disc 54 about the tapered seat 58 may further enhance this seal. Additionally, the opposing upper diaphragm spring 60 supplements the pressure within the lower and upper chambers 36, 40 to force downward movement of the main spring 42, so that the vertical passageway 44 remains tightly sealed. As such, the closure disc 54 effectively closes the fluid path from the inlet 28 to the outlet 50 to prevent the low pressure gauge connected to the low pressure gauge port 24 from over ranging. When pressure within the lower and upper chambers 36, 40 drops, the closure disc 54 disengages from the tapered seat 58 to reopen the vertical passageway 44, thereby exposing the low pressure gauge to pressurized fluid. In a particularly preferred embodiment, the valve 10 is manufactured for single set pressure matching the maximum indicated pressure of the low pressure gauge that attaches to the low pressure gauge port 24. In this respect, the valve 10 would not otherwise be field adjustable, outside of +/−1% to maintain consistency and operable reading accuracy. In alternative applications wherein the valve 10 is field adjustable, the main spring 42 is either selectively interchangeable or adjustable (e.g., via the tensioner 48 or other comparable device) so that the tension of the main spring 42 matches the maximum operating pressure of the then connected low pressure gauge.

FIG. 2 also illustrates the pressure limiting valve 10 including a removable screw 64 formed from the valve cap 16 of the pressure limiting valve 10. The valve 10 preferable includes the screw 64 for purposes of venting air from the upper chamber 40 so that the valve assembly 10 operates hydraulically.

Figure 3:
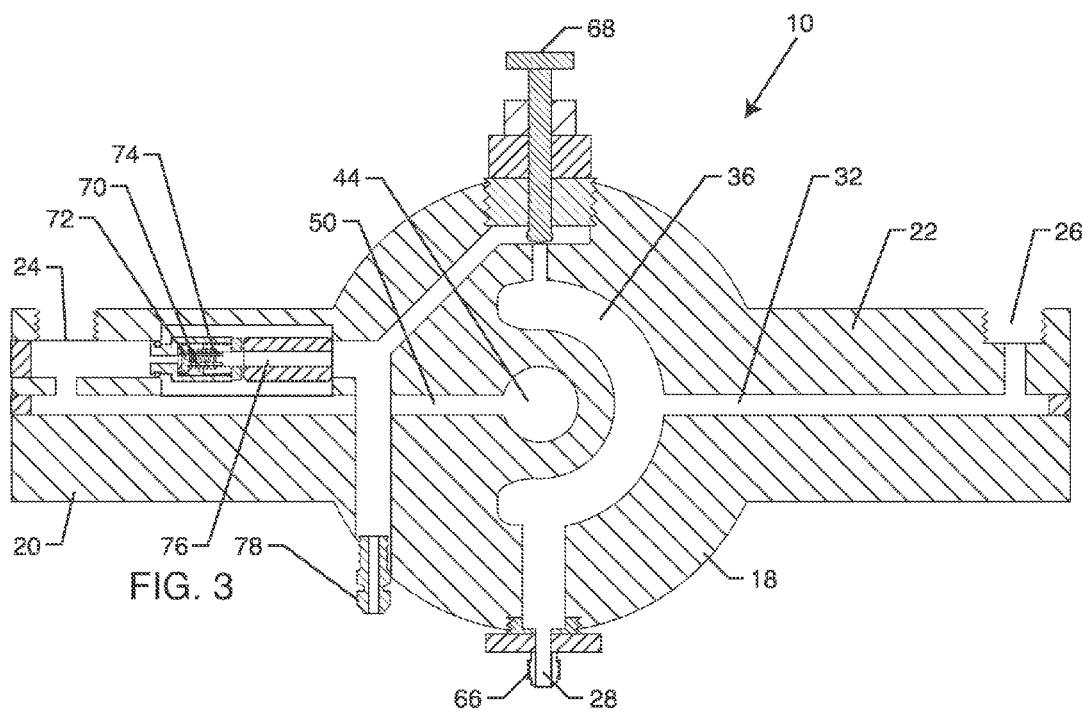
FIG. 3 is a cross-sectional view of the pressure limiting valve, taken about the line 3-3 in FIG. 1.

FIG. 3 is a cross-sectional view of the pressure limiting valve 10, taken about the line 3-3 in FIG. 1, further illustrating the internal operation thereof. In this embodiment, the inlet 28 includes an externally accessible hose connector 66 screwed into a portion of the valve body 18. Pressurized fluid enters the valve 10 through the inlet 28 when a hose or other fluid conduit is connected to the hose connector 66. The cross-sectional view of FIG. 3 illustrates the lower chamber 36 formed from a semi-spherical portion of the valve body 18. The high pressure feed tube 32 extends outwardly from the lower chamber 36 in the high pressure arm 22 to expose the high pressure gauge port 26 to the line pressure entering through the inlet 28. Accordingly, the line pressure can be measured when a high pressure gauge is connected to the port 26.

The use of the pressure limiting valve 10 disclosed herein allows for the installation of a high pressure gauge (e.g., one that can safely measure 150+ PSI) and a corresponding low pressure gauge (e.g., one that can safely measure less than 15 PSI) on the same high pressure system without damaging the low pressure gauge. As shown in FIG. 3, high pressure fluid flow entering the inlet 28 extends approximately 180° around the valve body 18 defined by the lower chamber 36. The high pressure feed tube 32 is positioned at an angle of about 90° from the inlet 28 so a high pressure gauge can be added. The fluid conduit 38 (best shown in FIGS. 2 and 4) provides a flow path for fluid entering the valve 10 from the lower chamber 36 to the upper chamber 40. A needle-valve port 68 or the like may be included in the valve assembly 10 so air can be removed (bleed) out from within, as described below. This is helpful as the valve 10 is designed to operate hydraulically. Additionally, the needle-valve port 68 may also control the speed by which the diaphragm 12 opens and closes the vertical passageway 44.

Initially, when pressure within the valve assembly 10 has not yet exceeded the maximum allowable pressure therein, pressurized fluid filling the upper chamber 40 flows past the closure disc 54 and into the vertical passageway 44 for eventual delivery to the low pressure gauge port 24 via the low pressure feed tube 50 in the low pressure arm 20. A relief valve 70 (e.g., having the same capacity as the low pressure gauge, e.g., 15 PSI) may be in fluid communication with the low pressure gauge port 24 as a safety check to ensure that excess fluid pressure (i.e., over the maximum pressure rating of the low pressure gauge) is vented to the atmosphere. This creates a flow through design on the low pressure side of the valve 10 to vent all air and excess pressure.

In this respect, the relief valve 70 may include a panel 72 biased into contacting a portion of the valve body 18 by a relief valve spring 74 designed to maintain the relief valve 70 in a closed position as generally shown in FIG. 3. Only when the pressure at the low pressure gauge port 24 exceeds the maximum threshold of the low pressure gauge does the panel 72 unseat therefrom to provide a conduit for pressurized fluid to escape the low pressure side of the valve assembly 10. In one embodiment, the spring 74 may be adjusted to keep the valve 70 open when pressure in the low pressure gauge port 24 is slightly above 15 PSI. Alternatively, the relief valve spring 74 may be rated to unseat from the panel 72 at a pressure just below the maximum allowable operating pressure that would otherwise damage the low pressure gauge. When the needle valve port 68 is engaged as shown in FIG. 3, excessively pressurized fluid may be released to the atmosphere by the relief valve 70 into a drain tube 76 coupled to an atmospheric drain 78. Alternatively, the needle valve port 68 may be disengaged to fluidly couple the lower chamber 36 (already fluidly coupled to the high pressure gauge) and the atmospheric drain tube 78 (already fluidly coupled to the low pressure gauge) for bleeding the pressure limiting valve 10 of residual air at setup. This ensures hydraulic operation of the valve 10. When the needle valve port 68 is in this open position, the low pressure gauge is not subject to over-pressurization because excess fluid pressure is released through the atmospheric drain 78. As such, and importantly, the aforementioned pressure limiting valve 10 has all the design configured requirements needed to test all approved backflow preventers, as discussed in more detail below.

The valve 10 shown and described above with respect to FIGS. 1-4 is not necessarily limited to testing approved backflow preventers. For example, the valve 10 may be used as a pressure limiting valve in hydraulic fluid applications, including those that do not use water. In this respect, in one embodiment, the valve 10 may only include the structure as generally described above with respect to FIG. 2. For example, with reference to FIG. 2, hydraulic fluid enters the valve 10 through the inlet 28 and fills the lower chamber 36 and the upper chamber 40 via the conduit 38. The main stem 46 remains biased in the open position shown in FIG. 2 while the pressure within the chambers 36, 40 remains below some threshold. The outlet 50 is exposed to the line pressure while the vertical passageway 44 remains open. Once the pressure of the hydraulic fluid surpasses some threshold closure pressure, the diaphragm 12 begins to deflect downwardly such that the main stem 46 travels into the vertical passageway 44, thereby allowing the closure disc 54 to seal against the tapered seat 58, as described above. This seals the vertical passageway 44 and limits the maximum pressure deliverable to the outlet 50. As such, this embodiment does not necessarily need to use some of the other structural features described above, such as the low and high pressure arms 20, 22, the high and low pressure feed ports 32, 34, the needle valve port 68, the relief valve 70, the panel 72, the relief valve spring 74, the drain tube 76, or the atmospheric drain 78. Rather, this embodiment is used only for limiting the maximum deliverable pressure from the inlet 28 to the outlet 50.

Figure 5:
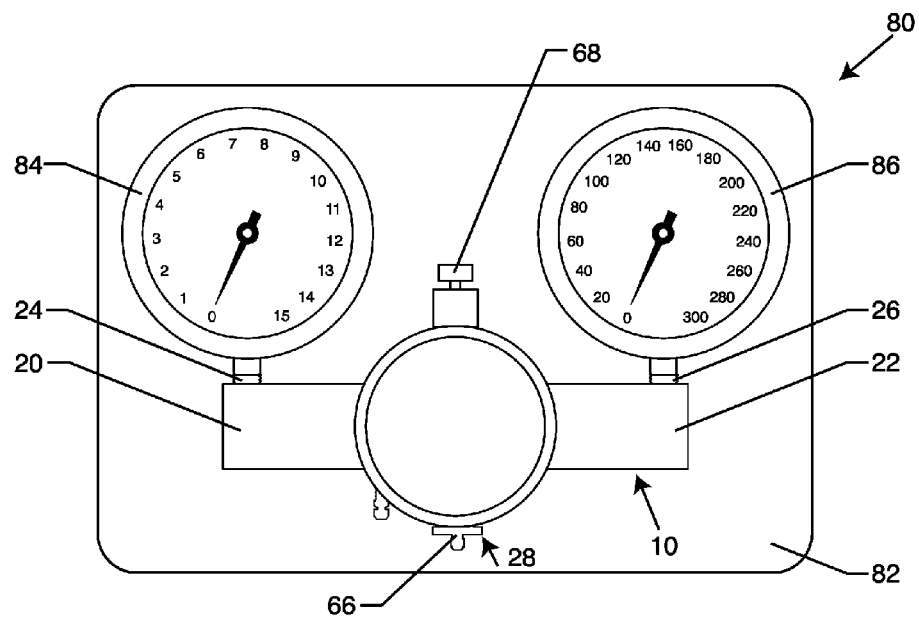
FIG. 5 is a front view of a test kit incorporating the pressure limiting valve disclosed herein.

FIG. 5 illustrates a test kit 80 incorporating the pressure limiting valve 10, as described in detail above, attached to a backboard 82. The test kit 80 is preferably permanently attached to the backboard 82. FIG. 5 further illustrates many of the features described above, such as the inlet 28 and the hose connector 66, the needle-valve port 68, along with the low pressure arm 20 extending out from the valve body 10 on one side and the high pressure arm 22 extending out from the valve body 10 on an opposite side. A low pressure gauge 84, having a maximum rating of 15 PSI is, accordingly, shown attached to the low pressure gauge port 24, and a high pressure gauge 86, having a maximum rating of 300 PSI, is shown attached to the high pressure gauge port 26. Preferably, the low and high pressure gauges 84, 86 are glycerin filled pressure gauges with respective ratings of 0-15 PSI and either 0-160 PSI or 0-300 PSI. Furthermore, the valve 10 should be a hydraulic valve, as described above.

Figure 6:
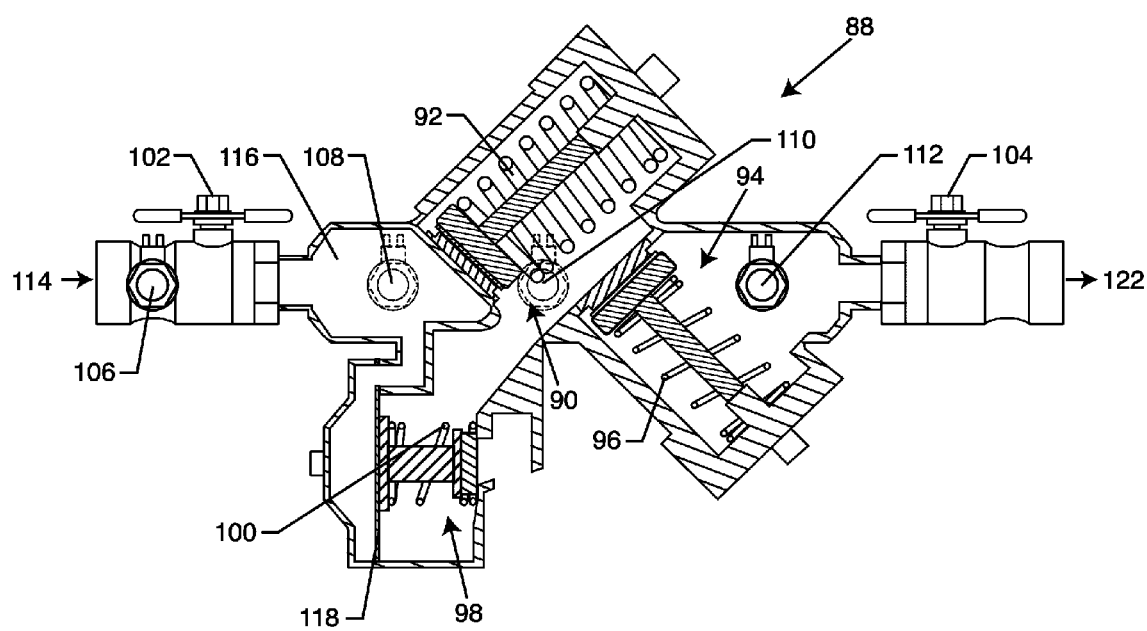
FIG. 6 is a cross-sectional view of an exemplary (RP) backflow preventer testable with the test kit of FIG. 5.

FIG. 6 generally illustrates the internal components of a reduced pressure principle (RP) backflow preventer 88, as is commonly known in the art. The backflow preventer 88 will be used herein as an exemplary backflow prevention device that can be tested with the test kit 80 with the valve 10. A person of ordinary skill in the art will readily recognize that the valve 10 and the test kit 80 may be used with a wide variety of backflow preventers, such as the (DC), (RP), (PVB) and (SVB) assemblies. Any description herein with respect to the (RP) backflow preventer 88 shall not be so limiting. As shown in FIG. 6, the backflow preventer 88 includes a first check valve 90 that has a ten pound (10 Lb) spring 92 that closes in the event of no flow that the system is in danger of experiencing fluid backflow. The backflow preventer 88 also includes a second check valve 94 that includes a two pound (2 LB) spring 96 similarly designed to prevent reverse fluid flow in the event of no flow in the system. In this example, the backflow preventer 88 further includes a relief valve 98 having a 2.5 pound spring (2.5 LB) spring 100. The spring 100 is normally held in a closed position as shown in FIG. 6 by normal pressure feeding the backflow preventer 88. Similar to the first and second check valves 90, 94, the relief valve 98 may open when pressure in the backflow preventer 88 drops to unsafe levels, i.e., when there is a risk that contaminated fluid may flow back toward the source. In that event, the relief valve 98 opens to the atmosphere and acts as a drain and allows air into the assembly, thereby preventing the backflow. Additionally, the backflow preventer 88 includes a pair of shut-off valves 102, 104 and a series of test cocks 106, 108, 110, 112.

Pressurized fluid from the source flows into the backflow preventer 88 through an inlet 114 thereby flooding a first chamber 116 on an upstream side of the first check valve 90 and the relief valve 98. The fluid in the first chamber 116 applies pressure against a diaphragm 118 coupled to the 2.5 pound spring 100 to close the relief valve 98. Under flow fluid otherwise forces open the rated ten pound spring 92 and the two pound spring 96 in the first and second check valves 90, 94, respectively, such that fluid can flow through the backflow preventer 88 to an outlet 122. In accordance with the hydraulics of the backflow preventer 88, for example, fluid entering through the inlet 114 at 100 PSI will experience an approximate 12 PSI drop by the time it reaches the outlet 122. This pressure drop is a result of the ten pound spring 92 and the two pound spring 96 and body generally resisting fluid flow through the backflow preventer 88. If the pressure at the inlet 114 (upstream side) stays above 2.5 PSI, the relief valve 98 will remain closed. However, if the pressure at the inlet 114 drops below 2.5 PSI, the relief valve 98 opens to the atmosphere because the pressure at the inlet 114 is at an unsafe backflow level. As such, the relief valve 98 is designed to eliminate the possibility of back siphoning. Additionally, the relief valve 98 may be opened to allow air into the backflow preventer 88. Typically, such a backflow preventer 88 is installed where there is a possibility of highly contaminated water flowing back into the distribution system as a result of inadequate pressure at the inlet 114.

FIGS. 7-36 illustrate a process for testing a backflow prevention device or assembly using the test kit 80 incorporating the pressure limiting valve 10, as described above. A person of trained skill in the art will recognize that the test kit 80 and the pressure limiting valve 10 may be used to test various backflow prevention devices or assemblies known in the art. As such, the use of the test kit 80 and the pressure limiting valve 10 with the backflow preventer 88 is merely a preferred embodiment, and the use of the kit 80 and the valve 10 should not be so limiting. The backflow preventer 88 is used to illustrate the principle operation of the pressure limiting valve 10 with the low pressure gauge 84 and the high pressure gauge 86. The basic operations discussed in more detail below may be used with other approved backflow preventers or similar assemblies.

As such, the first step in testing is to inspect the backflow preventer 88 for proper operation to verify that all approved valves are present and functioning correctly. If the backflow prevention device or assembly is not an approved design, it may not be possible to complete or certify the assembly. The backflow preventer 88 is an exemplary approved backflow prevention assembly because it also includes the requisite set of test cocks 106-112 and shut-off valves 102, 104. In this respect, the backflow preventer 88 should be inspected to ensure that each of the test cocks 106-112 and the shut-off valves 102, 104 are present and drip tight. If any are missing or otherwise leaking, corrective action is required before testing the backflow preventer 88.

To begin the testing procedure of the backflow preventer 88 using the one valve method associated with the test kit 80, the first step is to bleed water through each of the test cocks 106-112. This is accomplished by first ensuring that the shut-off valves 102, 104 are each open to allow water to flow through the backflow preventer 88. Then, to bleed water through each of the test cocks 106-112 to discharge debris from inside the assembly. The fourth test cock 112 is first opened, followed by progressively opening the third test cock 110, the second test cock 108 and the first test cock 106, in order. In this example, it is important to open the second test cock 108 slowly. Thereafter, each of the four test cocks 106-112 should be closed in reverse order.

Figure 7:
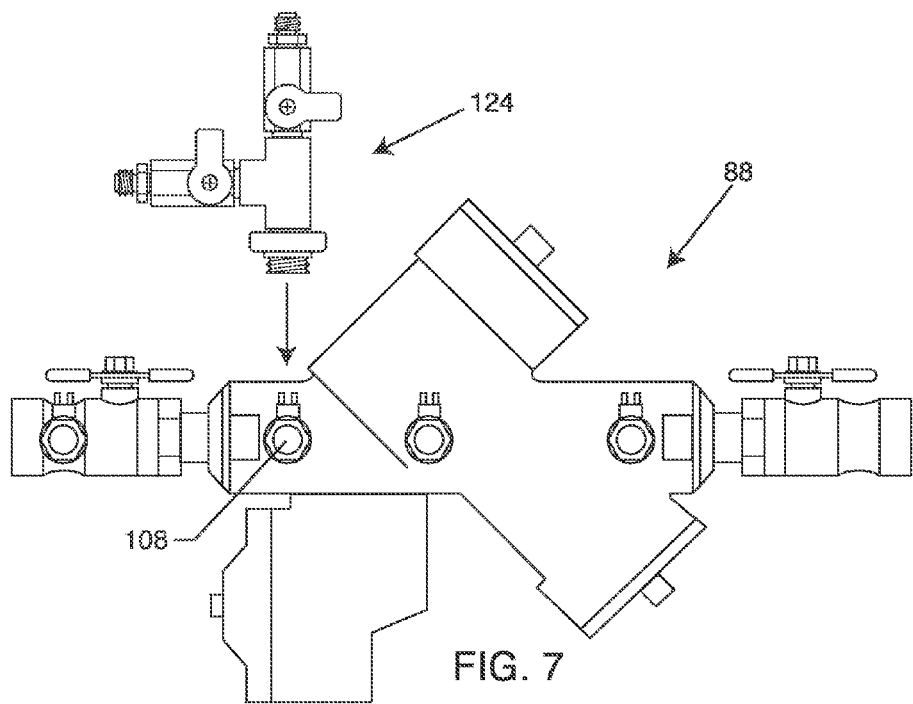
FIG. 7 is a schematic view illustrating attachment of a two valve tee to the backflow preventer.
Figure 8:
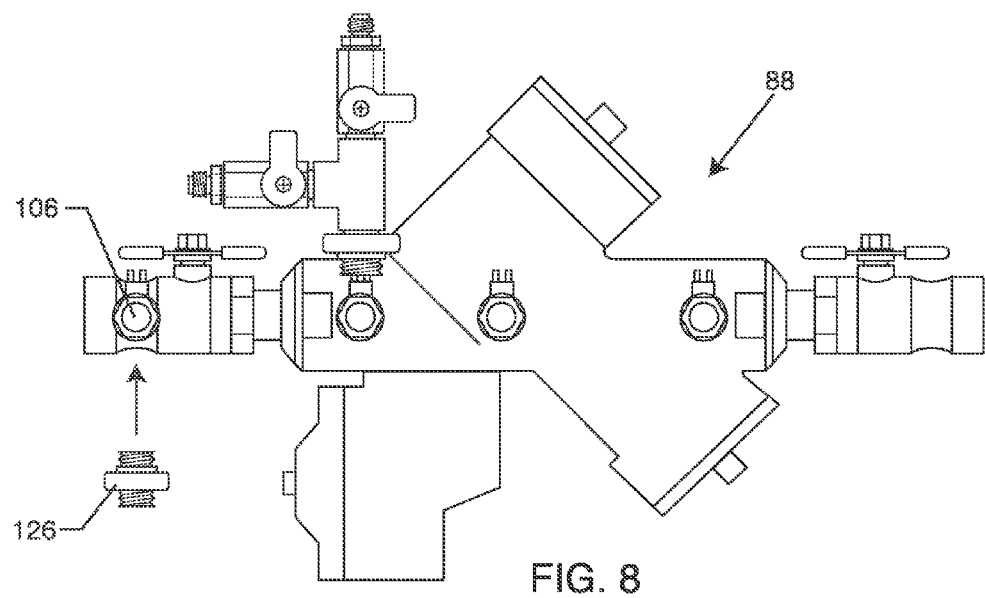
FIG. 8 is a schematic view illustrating installation of a quick connect adapter to a first test cock of the sample backflow preventer.
Figure 9:
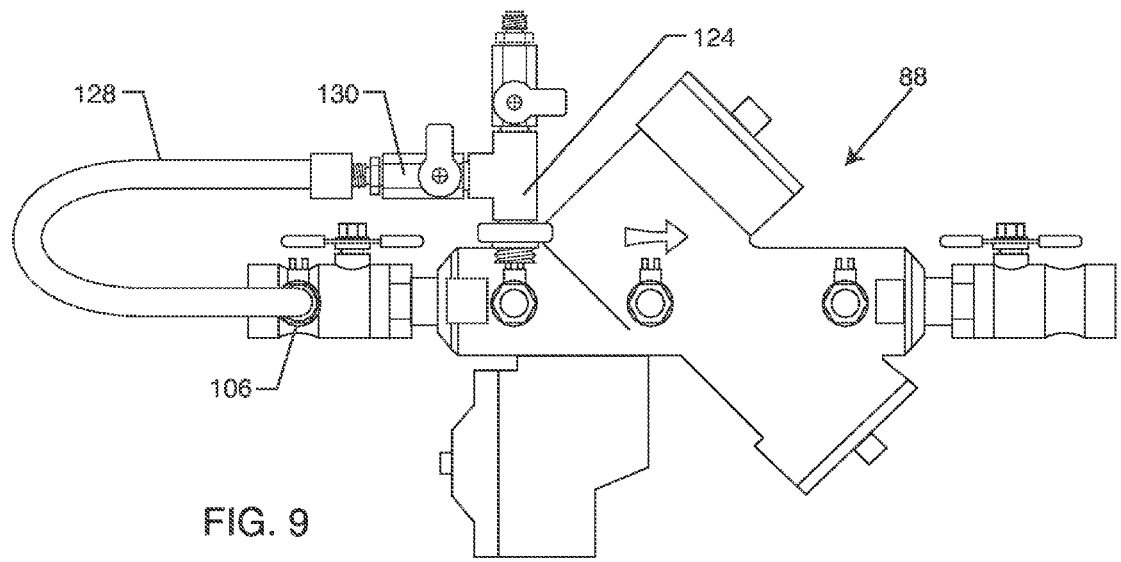
FIG. 9 is a schematic view illustrating installation of a by-pass hose from the first test cock to a center valve of the two valve tee.
Figure 10:
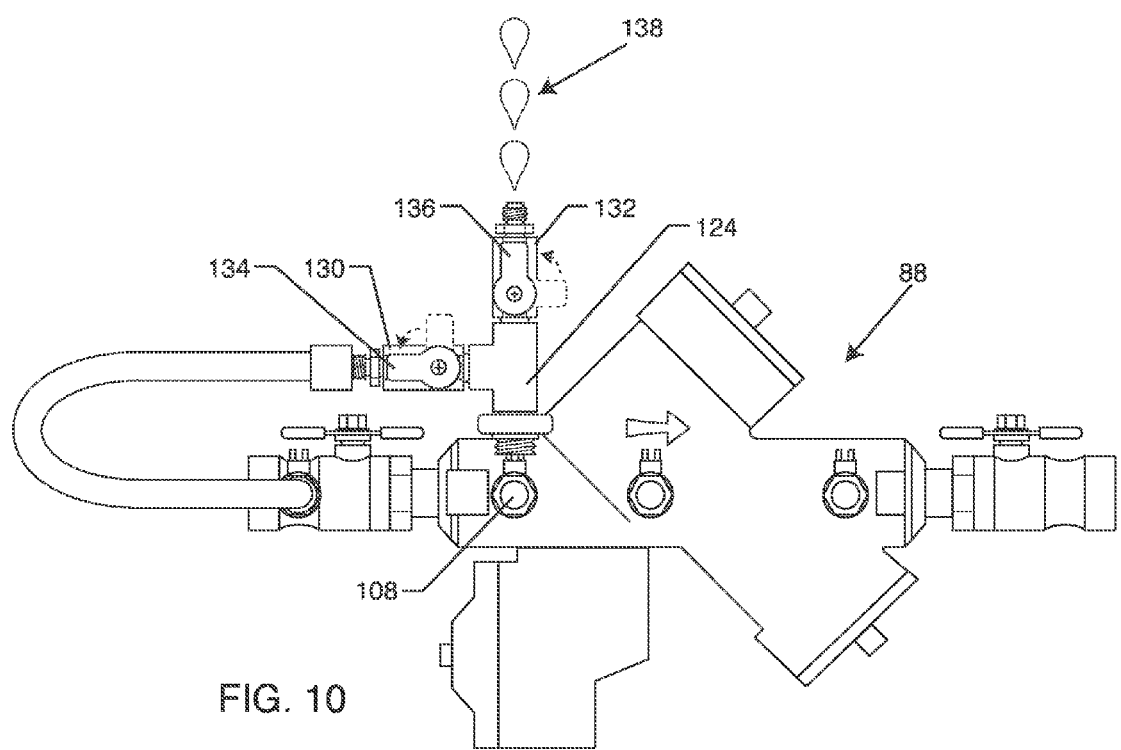
FIG. 10 is a schematic view illustrating establishment of a fast drip to a low stream through the two valve tee.
Figure 11:
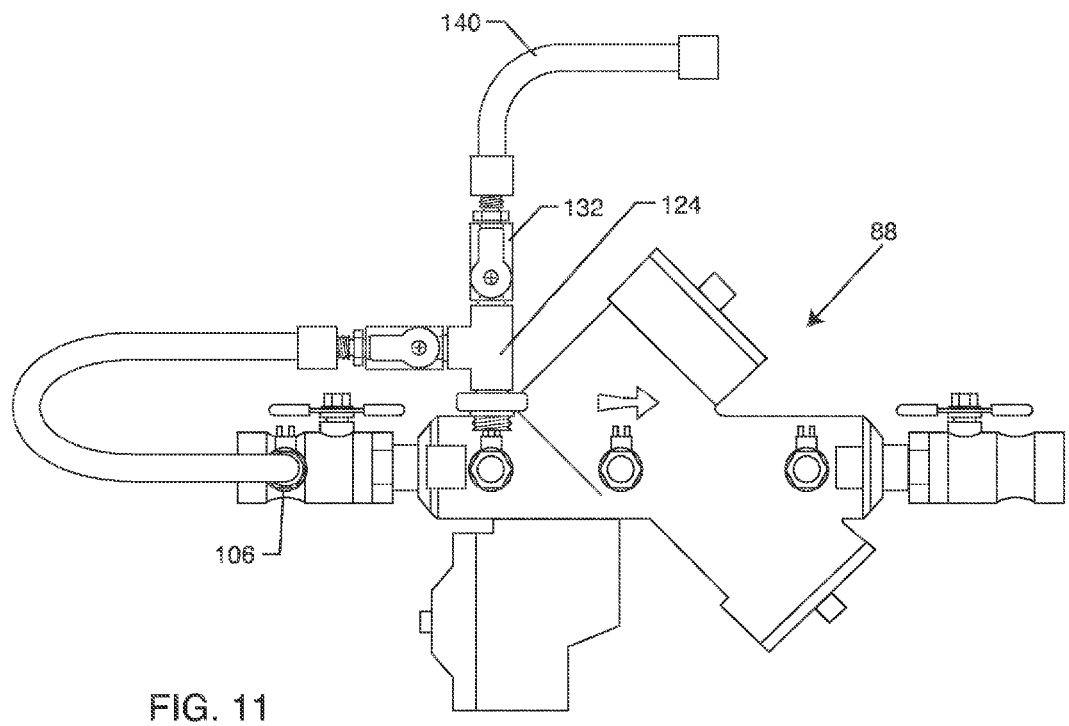
FIG. 11 is a schematic view illustrating connection of a connecting hose to the two valve tee that attaches to the pressure limiting valve.
Figure 12:
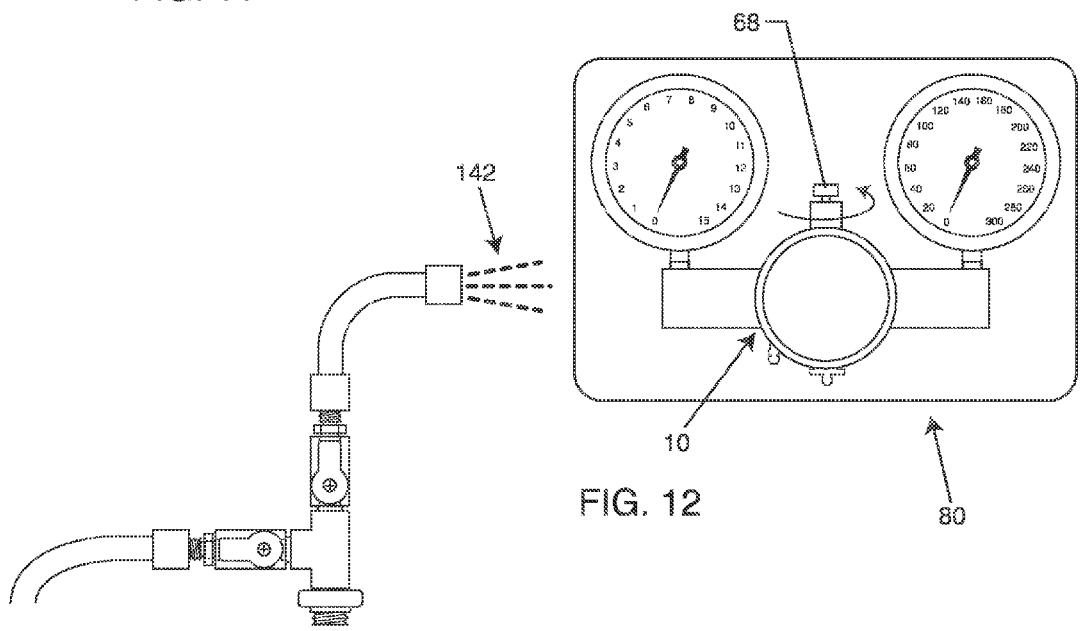
FIG. 12 is a schematic view illustrating opening the two valve tee to an open position that establishes a slow stream out from the connecting hose.

Next, FIG. 7 illustrates installation of a two valve tee 124 to the second test cock 108. Then, as shown in FIG. 8, a quick connect adapter 126 is installed to the first test cock 106. FIG. 9 illustrates installation of a by-pass hose 128 between the first test cock 106 (via the quick connect adapter 126) to a center valve 130 on the two valve tee 124. Next, the center valve 130 and an end valve 132 on the two valve tee 124 are opened by turning a respective pair of valve levers 134, 136 (FIG. 10). Then, the second test cock 108 is slowly opened to establish a fast drip 138 out from the valves 130, 132 (FIG. 10). Once the fast drip 138 is established, the second test cock 108 is closed. This effectively stops the flow of water leaving the valves 130, 132. The next step, as shown in FIG. 11, is to attach a connecting hose 140 to the end valve 132 of the two valve tee 124. At this point, it is important to connect the connecting hose 140 to the two valve tee 124 only, and not the test kit 80. The next step, as shown in FIG. 12, is to fully bleed the valve assembly 10. This is accomplished by fully opening the needle valve port 68, described above. Next, a slow stream of water 142 exiting the connecting hose 140 is established by slowly opening the first test cock 106. The small stream 142 will remove all air out from within the hose before connection to the test kit 80.

Figure 13:
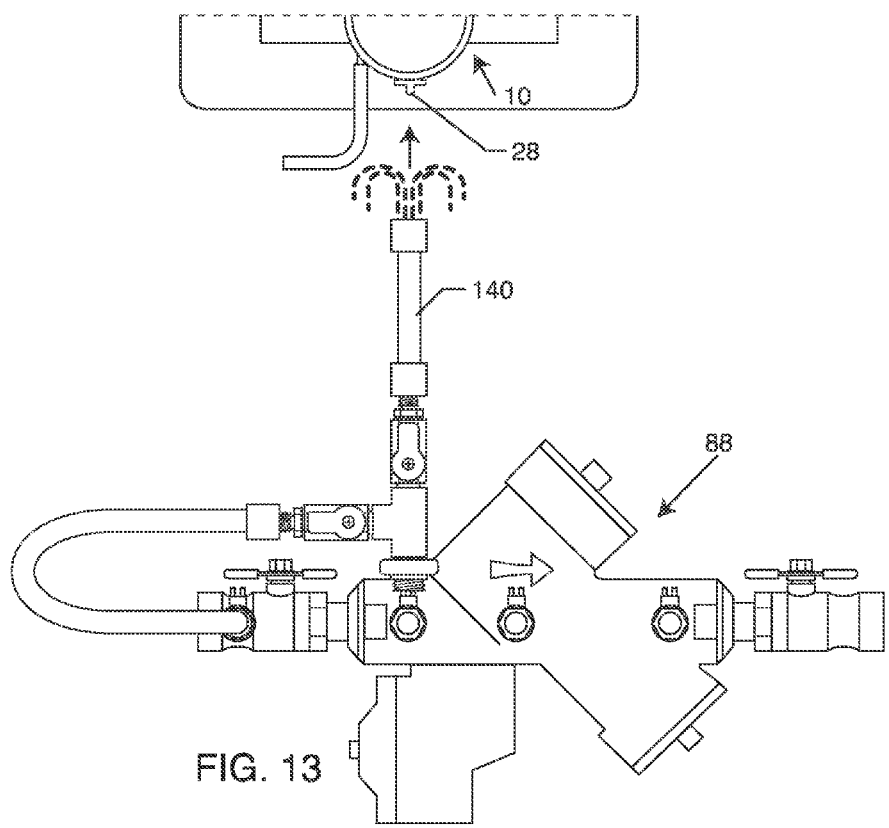
FIG. 13 is a schematic view illustrating connection of the connecting hose to the test kit incorporating the novel pressure limiting gauge, while maintaining the slow stream of water in the open bleed position.
Figure 14:
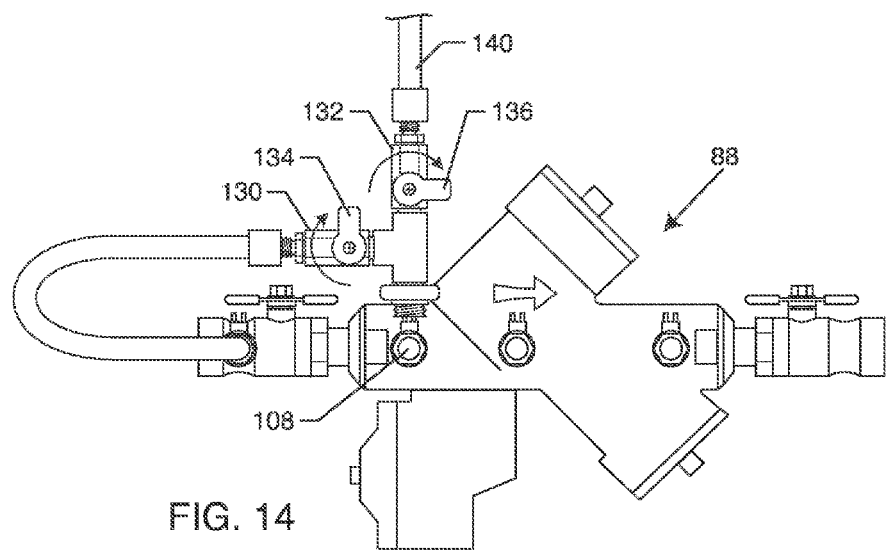
FIG. 14 is a schematic view illustrating closure of the center and end valves on the two valve tee.
Figure 15:
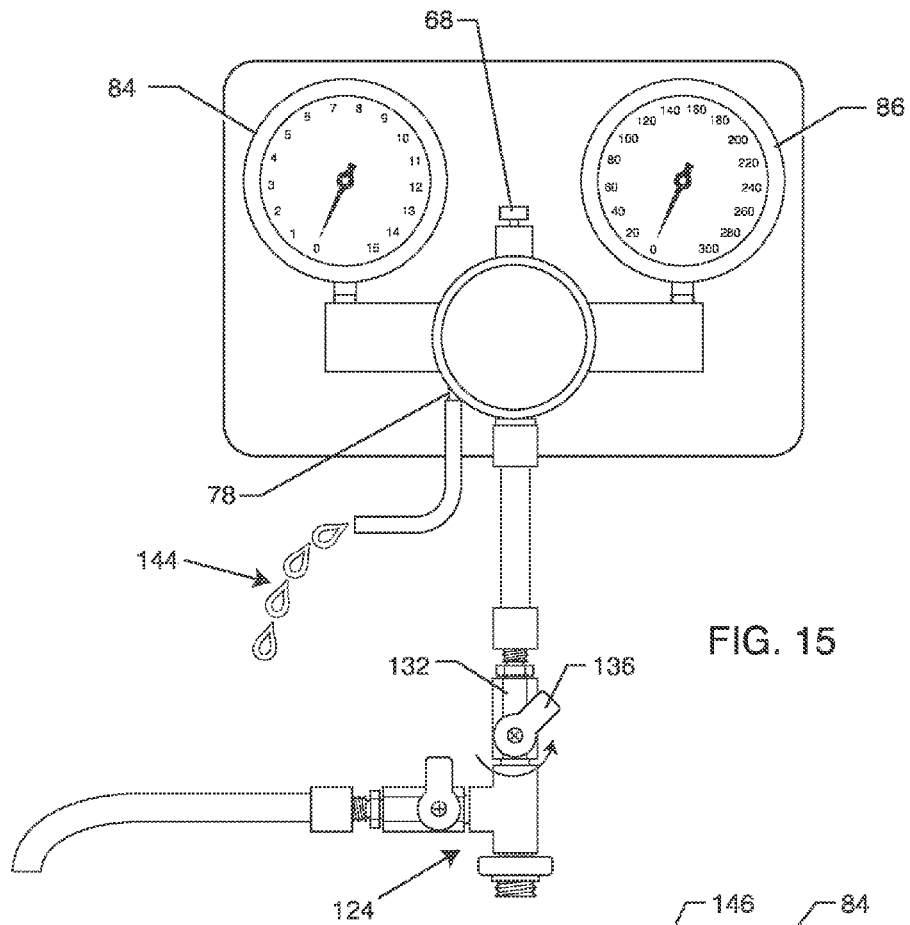
FIG. 15 is a schematic view illustrating controlled opening of the end valve to establish a fast drip to a slow stream from an atmospheric drain incorporated into the test kit.

Accordingly, the next step, as shown in FIG. 13, is to attach the connecting hose 140 (still with the slow stream 142 exiting therefrom) to the inlet 28 of the valve assembly 10. Maintaining the slow stream 142 is necessary because the gauges 84, 86 are hydraulically operated. As such, all air within the test kit 80 must be removed. Otherwise, the test kit 80 may malfunction or provide incorrect readings. The next step is to close the end valve 132 by moving the valve lever 136 to the position shown in FIG. 14. Next, the center valve 130 is similarly closed by moving the valve lever 134 to the position shown in FIG. 14. Next, the second test cock 108 is fully opened. At this point, fluid will not exit the connecting hose 140 because the two valves 130, 132 are closed. As such, the next step is to slowly open the end valve 132 by moving the valve lever 136 along the directional arrow shown in FIG. 15.

The valve lever 136 is preferably rotated counter-clockwise to a position that establishes a slow flow 144 from the atmospheric drain 78. At this point, the needle valve port 68 is disengaged, as described above. Next, the needle valve port 68 on the test kit 80 should be slowly closed. At the same time, a low pressure gauge pointer 146 on the low pressure gauge 84 rises until it reaches the maximum limit of 15 PSI. This indicates activation of the pressure limiting valve 10. If the pointer 146 stops before reaching 15 PSI, then the needle valve port 68 was closed too quickly. If this occurs, the end valve 132 on the two valve tee 124 should be closed and then slowly reopened bleed valve according to the steps described above.

Figure 16:
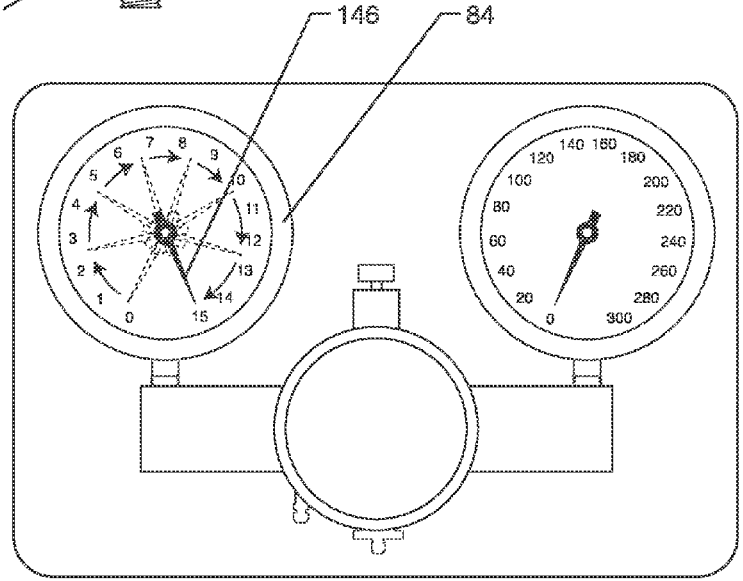
FIG. 16 is a schematic view illustrating controlled closure of a needle valve port on the test kit to control pressure increase supplied to a low pressure gauge.
Figure 17:
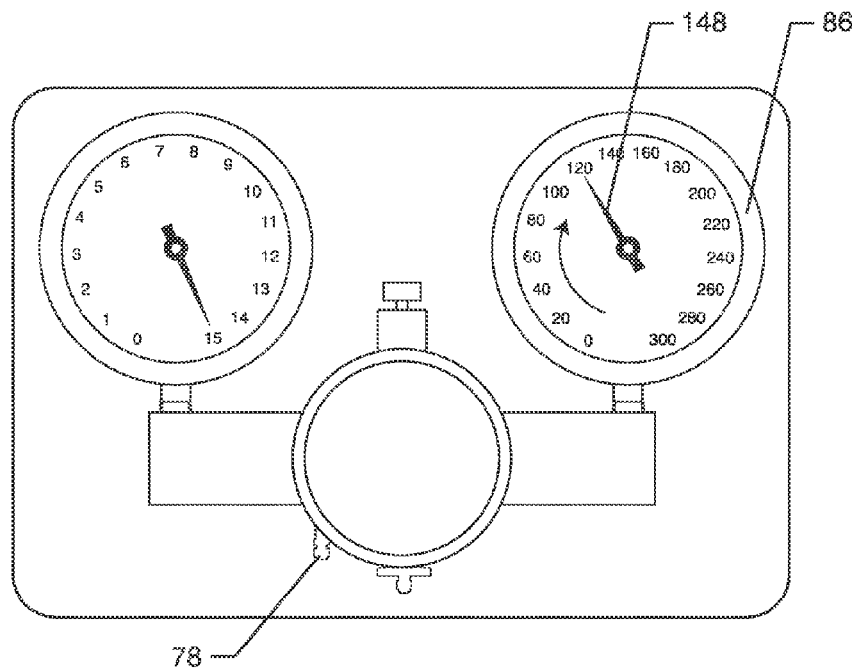
FIG. 17 is a schematic view illustrating complete closure of the needle port valve such that the high pressure gauge measures the sample line pressure (120 PSI) and the low pressure gauge reads 15 PSI.
Figure 18:
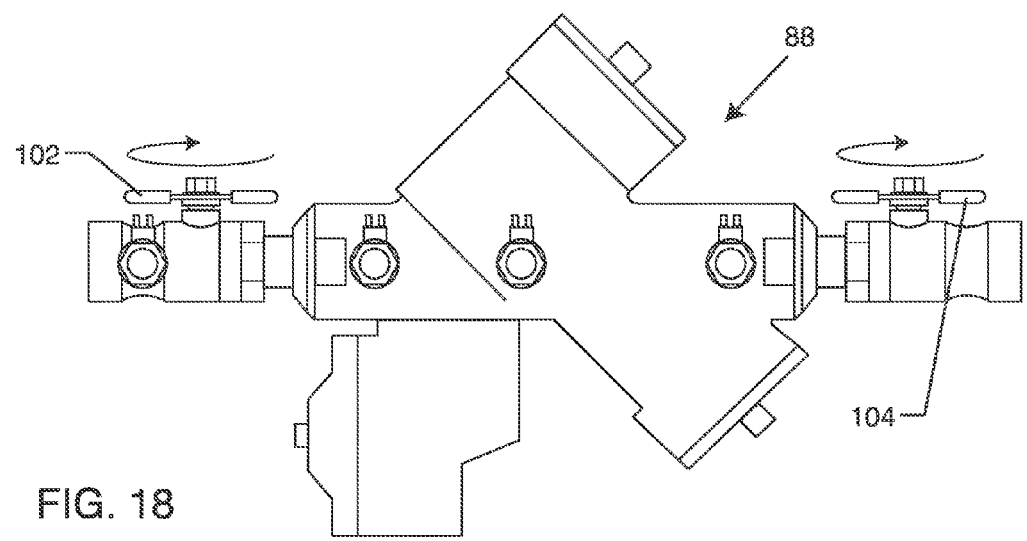
FIG. 18 is a schematic view illustrating closure a pair of shut-off valves incorporated into the (RP) backflow preventer.
Figure 19:
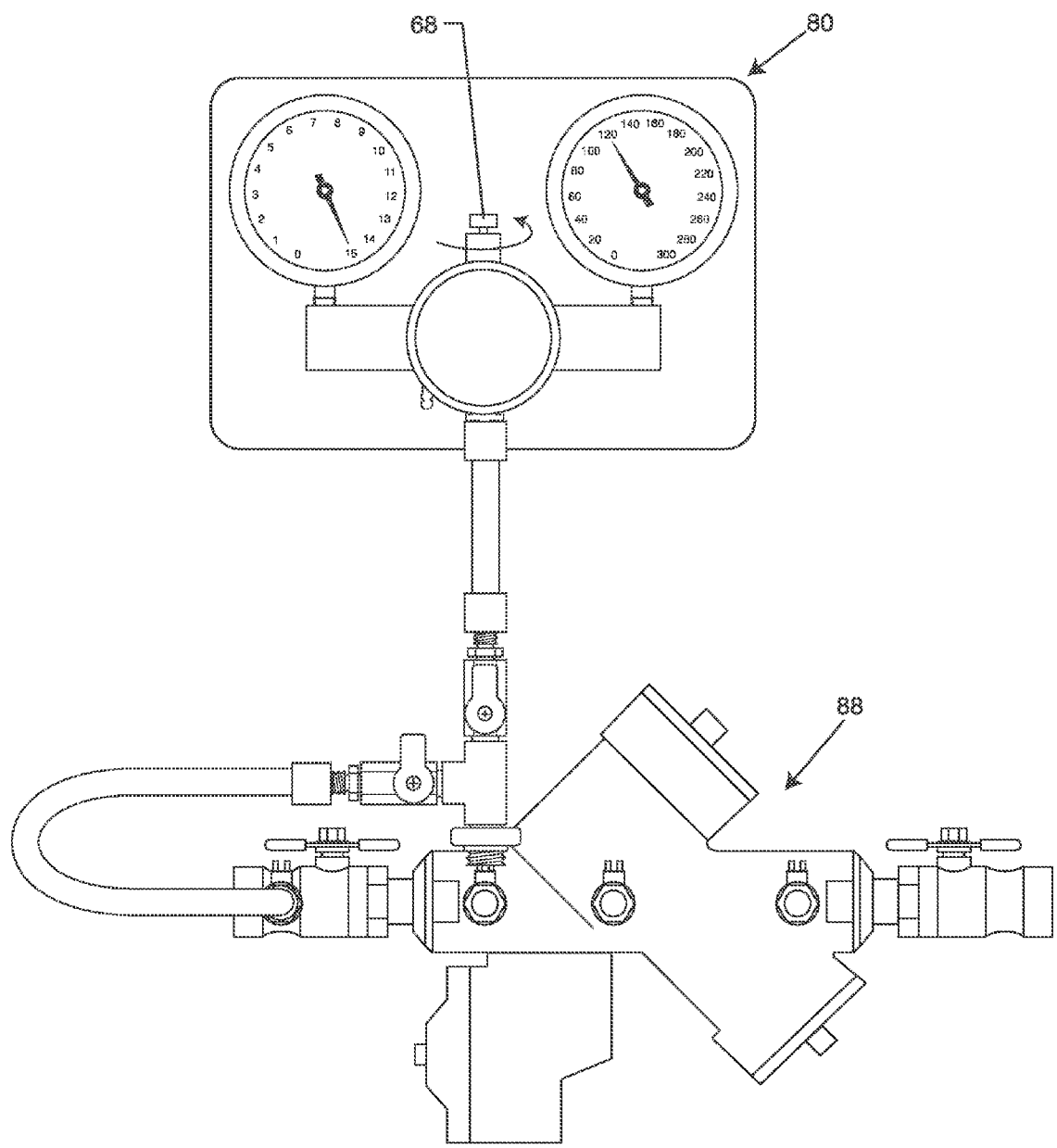
FIG. 19 is a schematic view illustrating controlled opening of the needle valve port on the test kit, thereby reducing the pressure reading of the corresponding low and high pressure gauges.
Figure 20:
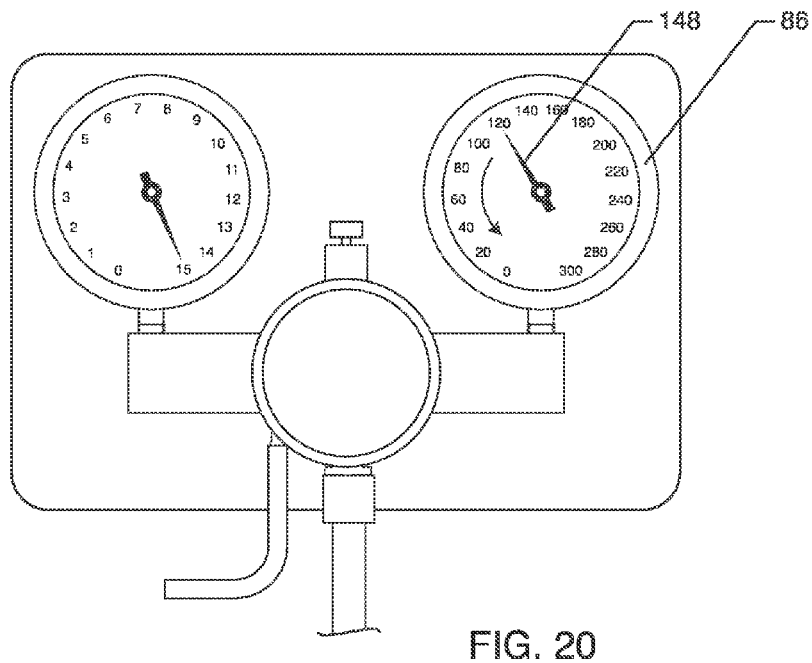
FIG. 20 is a schematic view illustrating relief valve opening point pressure readings of the high and low pressure gauges.
Figure 21:
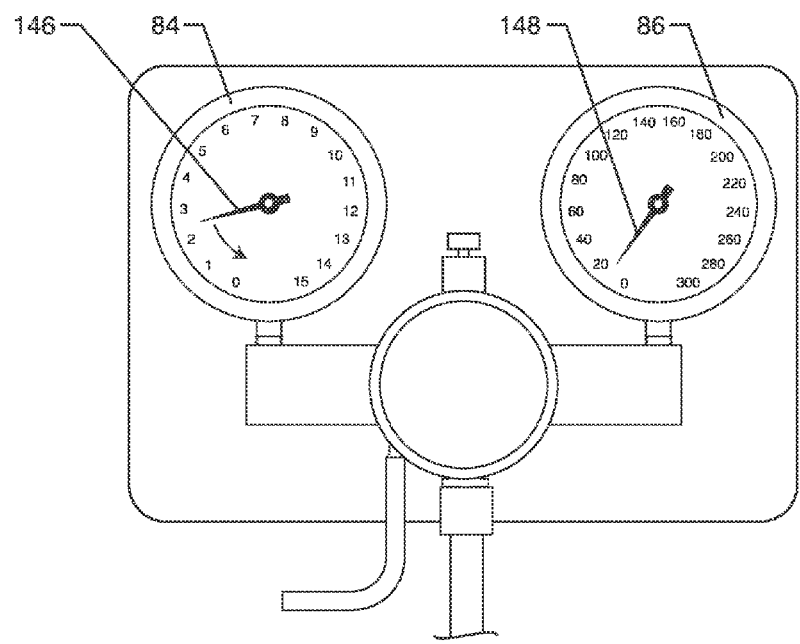
FIG. 21 is a schematic view illustrating synchronized readings of the low and high pressure gauges.
Figure 22:
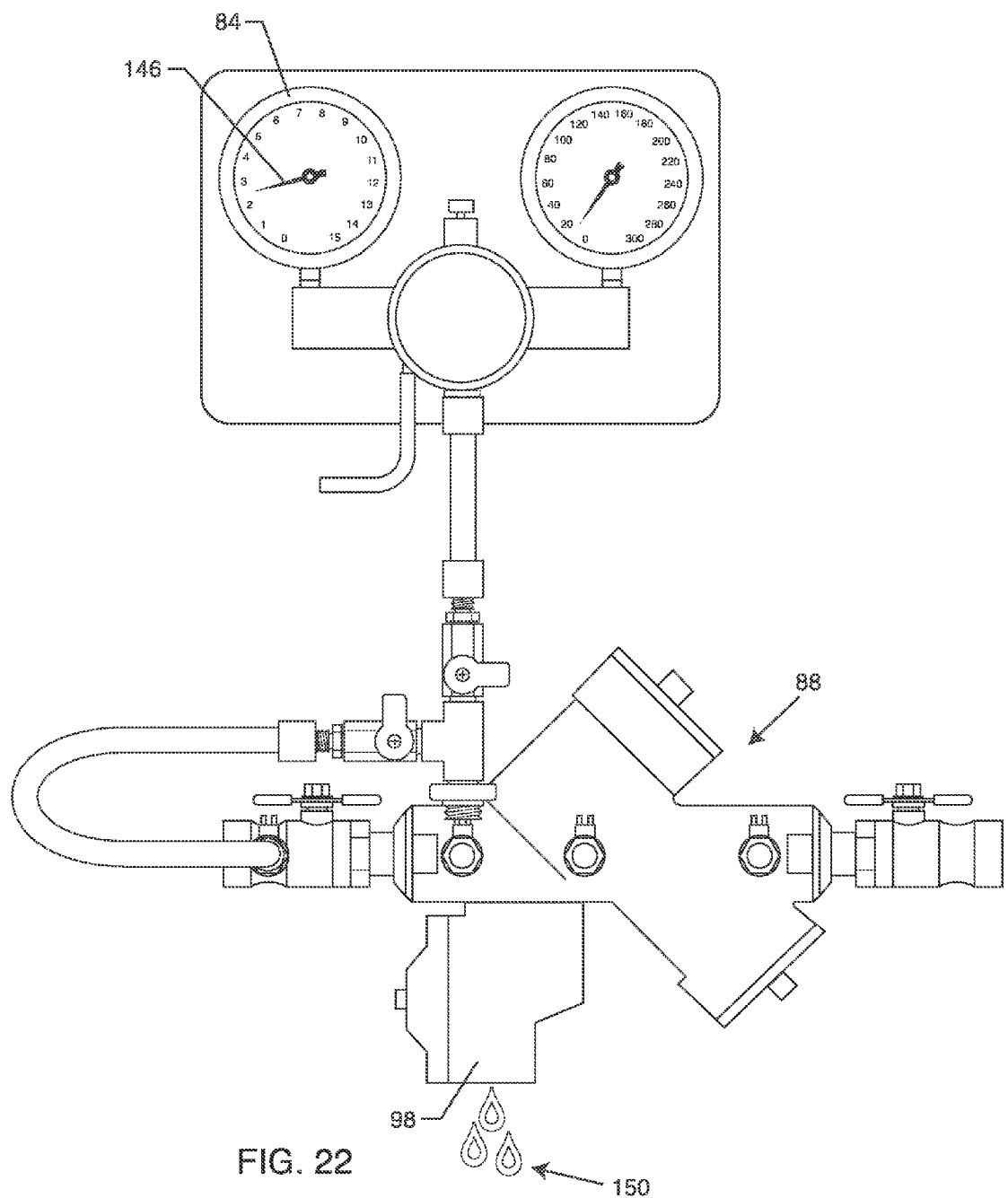
FIG. 22 is a schematic view illustrating a sample pressure gauge reading of both the low and high pressure gauges at the point of water discharge from a relief valve of the (RP) backflow preventer.

In FIG. 16, the needle valve port 68 has been successfully closed when the pointer 146 on the low pressure gauge 84 reaches 15 PSI. At this point, as shown in FIG. 17, the high pressure gauge 86 will begin showing appreciable readings regarding the line pressure in the backflow preventer 88. Liquid will also stop exiting the atmospheric drain 78. The end valve 132 should be fully opened at this point by moving the valve lever 134 to the position, e.g., as shown in FIG. 13, so that the high pressure gauge 86 is exposed to the maximum line pressure in the backflow preventer 88. The high pressure gauge pointer 148 will settle at the line pressure of the backflow preventer 88—in this example 120 PSI. The next step is to close the first and second shut-off valves 102, 104 (FIG. 18). The backflow preventer 88 is now in a static state and no longer subject to external line influence because liquid is no longer able to flow therethrough. FIG. 19 illustrates the next step of slowly opening the needle valve port 68, preferably not more than one-quarter turn. As a result, the pressure readings of the high pressure gauge 86 slowly drop (FIG. 20). The pressure drop occurs as upstream pressurized fluid is allowed to exit the backflow preventer 88 through the test kit 80. Once the high pressure gauge pointer 148 reaches 15 PSI (FIG. 21), the low pressure gauge pointer 146 starts to drop, as denoted by the directional arrow in FIG. 21. The low pressure gauge 84 will drop to the opening point of the relief valve 98 (e.g., 2.5 PSI to correlate with the 2.5 pound spring 100) such that there is liquid discharge 150 as shown in FIG. 22.

At this point, the opening point of the relief valve 98 should be recorded. Preferably, that value is fairly close to the 2.5 pound spring 100. That is, the low pressure gauge 84 should read approximately 2.5 PSI because the 2.5 pound spring 100 (FIG. 6) can overcome the upstream pressure within the first chamber 116 at this PSI to open the relief valve 98. When the relief valve 98 opens, the pressure in the first chamber 116 is lowered by reduced pressure to the operating tension of the 2.5 pound spring 10, and is thus recordable. It is preferred that the low pressure gauge 84 be marked at 0.1 to 0.2 PSI intervals to ensure a high accuracy reading. This allows the low pressure gauge pointer 146 to indicate pressure changes as low as 0.1 or 0.2 PSI. In this example, the relief valve 98 may be considered to be functioning correctly if the low pressure gauge 84 reads 2.5 PSI or higher when the liquid discharge 150 is first discharged from the backflow preventer 88 (FIG. 22). If the opening point of the relief valve 98 is below 2.0 PSI (i.e., 1.9 PSI) or the relief valve 98 did not open at all, the relief valve 98 is not functioning correctly and remaining tests cannot be completed until corrective action is taken.

Figure 23:
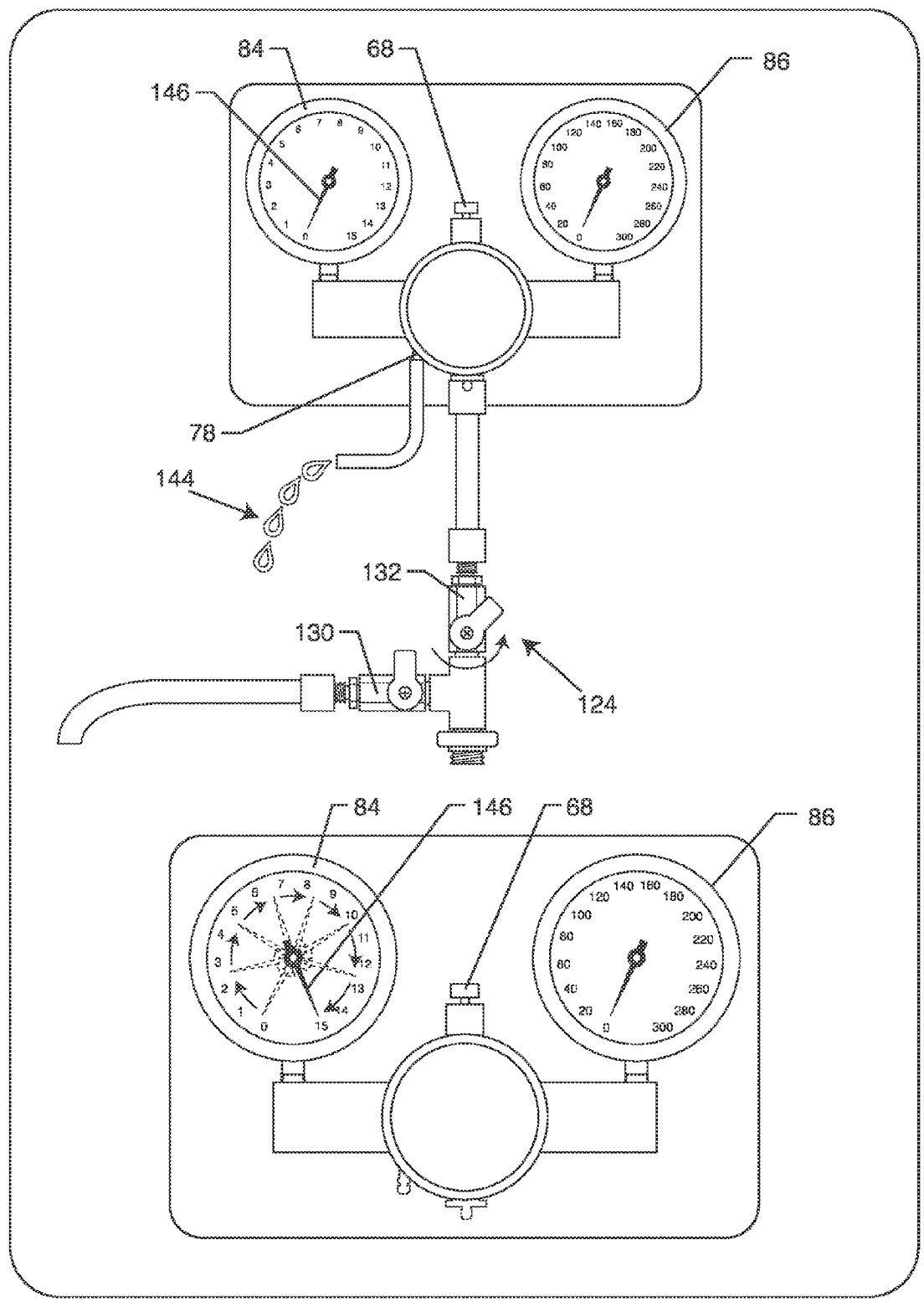
FIG. 23 is a schematic view illustrating opening the needle valve port and the center valve to establish the fast drip or low flow out from the atmospheric drain such that the pressure delivered to the low pressure gauge increases.

Assuming the relief valve 98 is functioning correctly and its value is recorded, the needle valve port 68 should be opened one full turn followed by slowly opening the center valve 130 on the two valve tee 124 to establish the medium flow 144 from the atmospheric drain 78. The low and high pressure gauges 84, 86 will again read the same (e.g., as shown in FIG. 17). When the needle valve port 68 is slowly closed the low pressure gauge pointer 146 will reach 15 PSI (e.g., as shown in FIG. 17). In this respect, FIG. 23 illustrates the combination of the steps described above with respect to FIGS. 16 and 17. As such, the test kit 80 is in a similar state as it was with respect to completion of the steps described above with respect to FIGS. 15-17.

Figure 24:
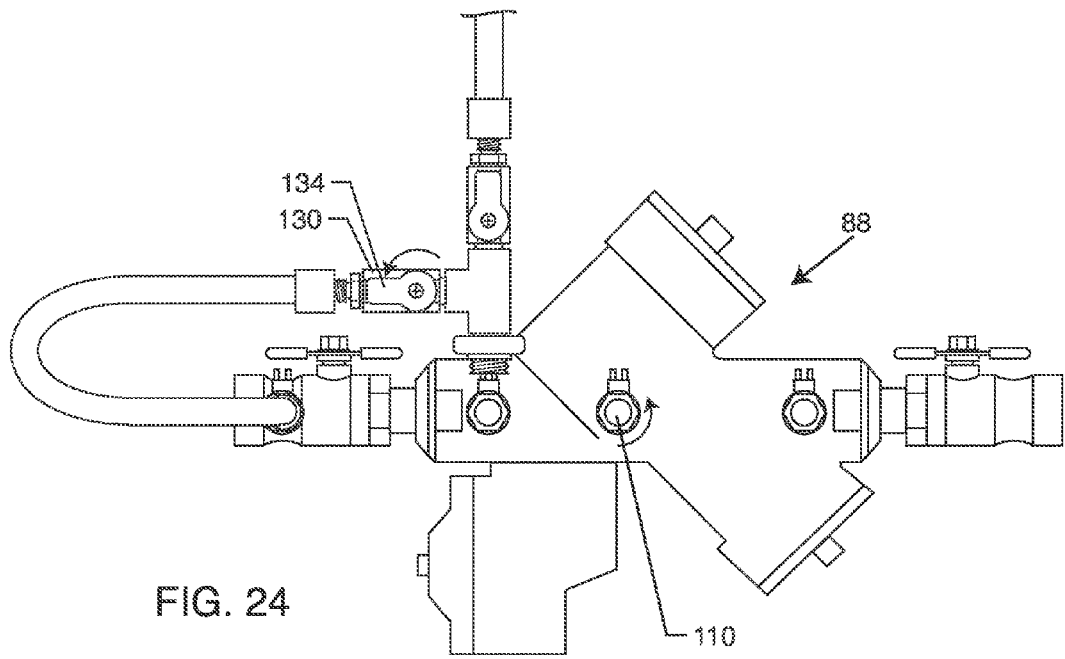
FIG. 24 is a schematic view illustrating opening a third test cock to bleed air from the backflow preventer after opening the center valve on the two valve tee.
Figure 25:
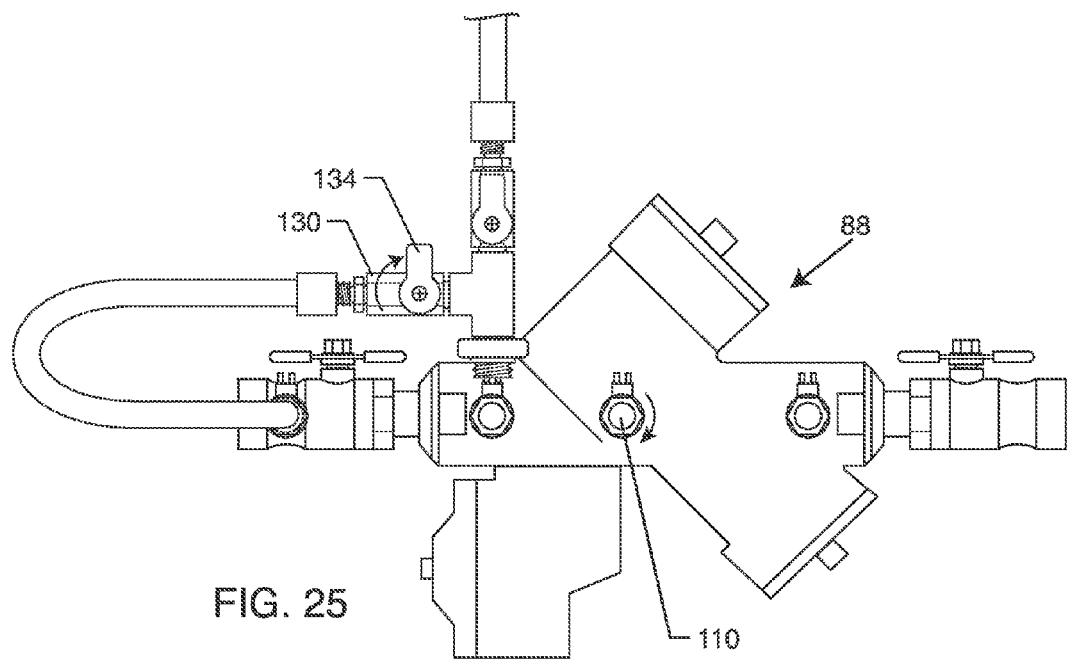
FIG. 25 is a schematic view illustrating closing the third test cock and the center valve on the two valve tee.
Figure 26:
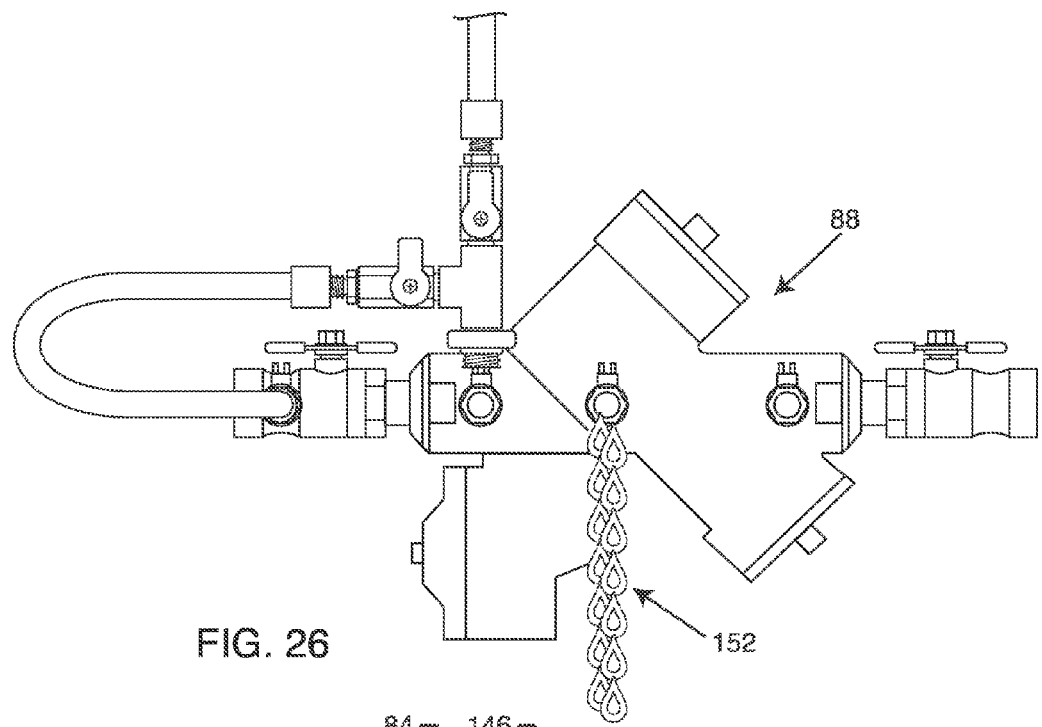
FIG. 26 is a schematic view illustrating opening the third test cock until there is a pressure drop reading on the high pressure gauge.
Figure 27:
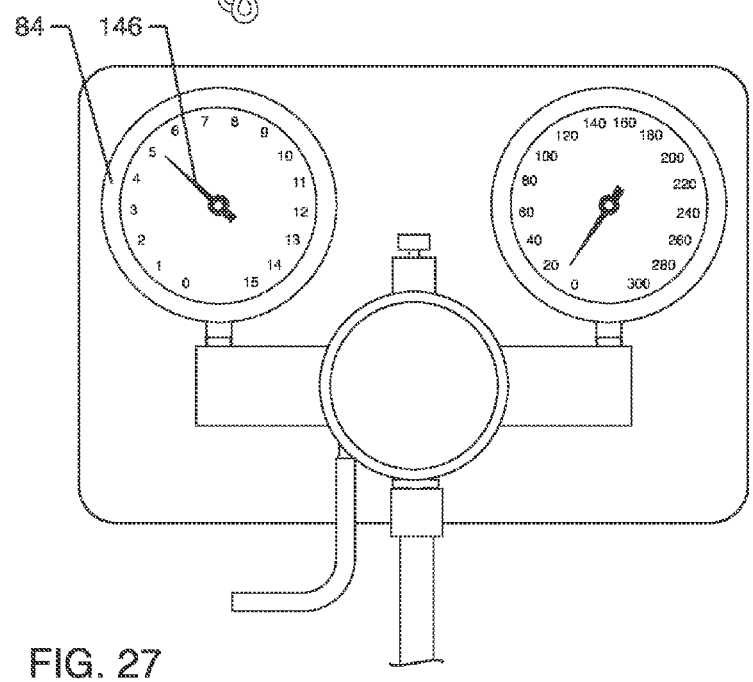
FIG. 27 is a schematic view illustrating reading the low pressure gauge for the (CV) pressure rating.
Figure 28:
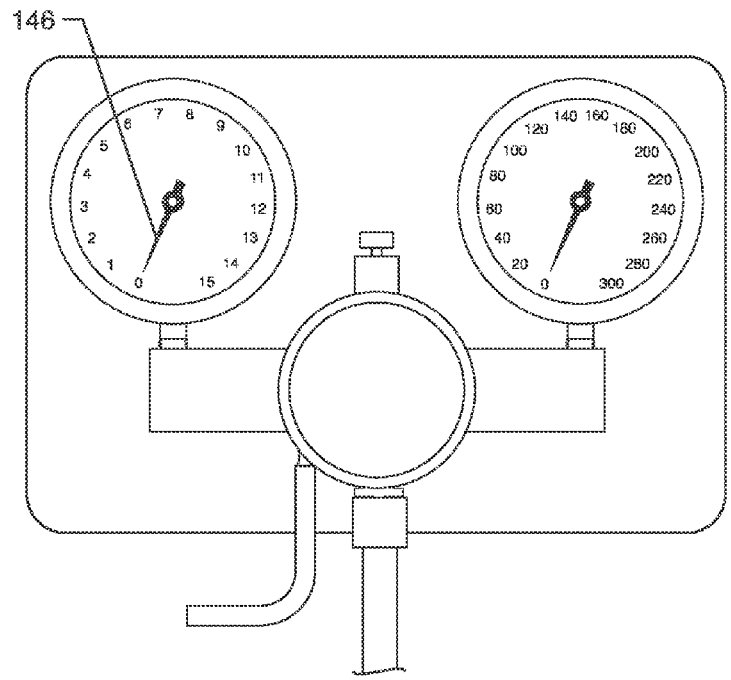
FIG. 28 is a schematic view illustrating a condition wherein the low and high pressure gauge readings are too low, thereby indicating that the first check valve is leaking.

Once the needle valve port 68 on the test kit 80 has been closed and the low pressure gauge 84 reads 15 PSI, the center valve 130 is fully opened by turning the valve lever 134 to the position shown in FIG. 24. Next, the third test cock 110 is opened to bleed any remaining air from the backflow preventer 88 (FIG. 24). This ensures that the system continues to operate hydraulically. Once the remaining air is removed from the backflow preventer 88, the third test cock 110 is then closed. Thereafter, the center valve 130 is closed by moving the valve lever 134 to the position shown in FIG. 25. The next step is to slowly open the third test cock 110 to discharge the liquid 152, as shown in FIG. 26, on the downstream side of the first check valve 90. As a result of the discharging liquid 152, the pressure reading on the high pressure gauge 86 starts dropping. Pressurized fluid in the chamber 116 (i.e., the upstream side of the first check valve 90) is initially able to overcome the resistive force of the ten pound spring 92, thereby bypassing the first check valve 90, to escape out through the third test cock 110 (FIG. 6). Once the pressure in the chamber 116 drops low enough, the ten pound spring 92 closes the first check valve 90. Thus, no more fluid from chamber 116 can escape through the open third test cock 110. This static state is similar to that described above with respect to testing the relief valve 98. As such, FIG. 27 illustrates the low pressure gauge pointer 146 at approximately 5 PSI. The low pressure gauge pointer 146 should stop at a reading higher than the lowest rated opening point of the relief valve 98. Ideally, the value measured by the low pressure gauge 84 is 3 PSI or greater. In this example, 3 PSI is greater than the maximum rating of the 2.5 pound spring 100 associated with the relief valve 98. Since the low pressure gauge 84 is reading 5 PSI in FIG. 27, the value should be recorded because the first check valve 90 is holding tight. If, alternatively, the readings drop to the low end of the scale (e.g., designated by the low pressure gauge pointer 146 indicating zero PSI in FIG. 28), the relief valve 98 will open and discharge water (not shown in FIG. 29). This occurs because the first check valve 90 did not close and the chamber 116 has continued to lose pressure as fluid escapes through the first check valve 90 out through the third test cock 110. In this scenario, the first check valve 90 is leaking and should be recorded as such.

Figure 29:
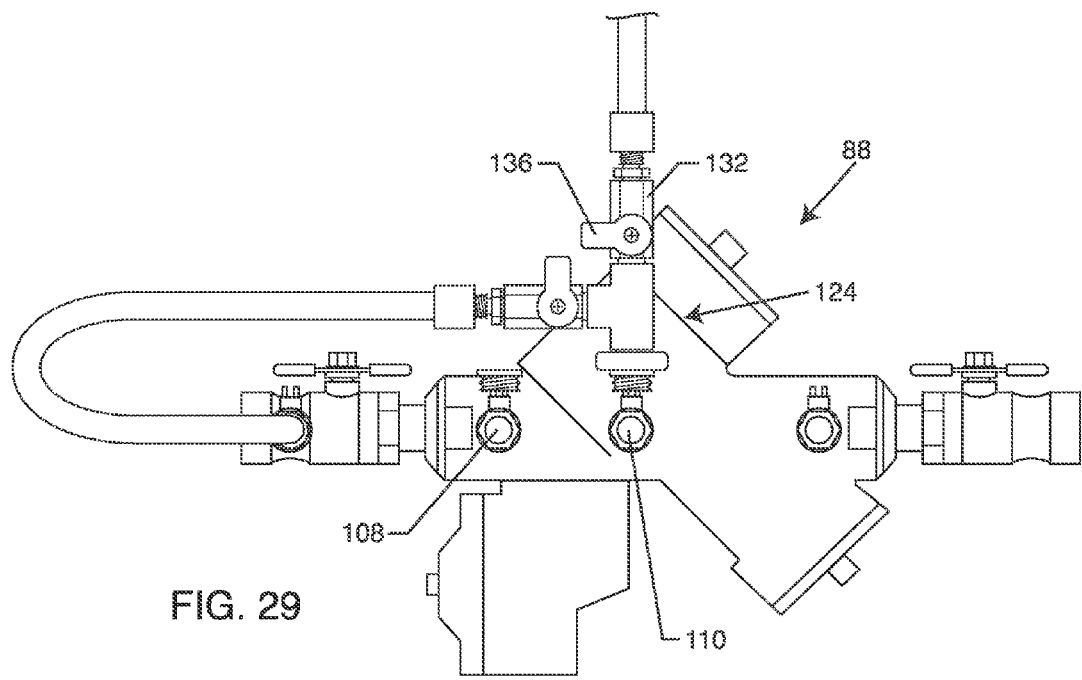
FIG. 29 is a schematic view illustrating closing the end valve on the two valve tee and moving the two valve tee to the third test cock.

Assuming that the first check valve 90 is functioning correctly, the next step is to check the operation of the second check valve 94. The first step here is to close the end valve 132 on the two valve tee 124, then move the two valve tee 124 to the third test cock 110. Before moving the two valve tee 124, however, the valve lever 136 should be moved to a position (FIG. 29) that closes the end valve 132. The procedures for moving the two valve tee 124 from the second test cock 108 to the third test cock 110 are well known in the art. In this respect, a person of trained skill in the art will readily recognize that the two valve tee 124 may be disconnected and reconnected to any of the test cocks 106-112 using equipment well known in the art. Accordingly, FIG. 29 illustrates the two valve tee 124 connected to the third test cock 110.

Figure 30:
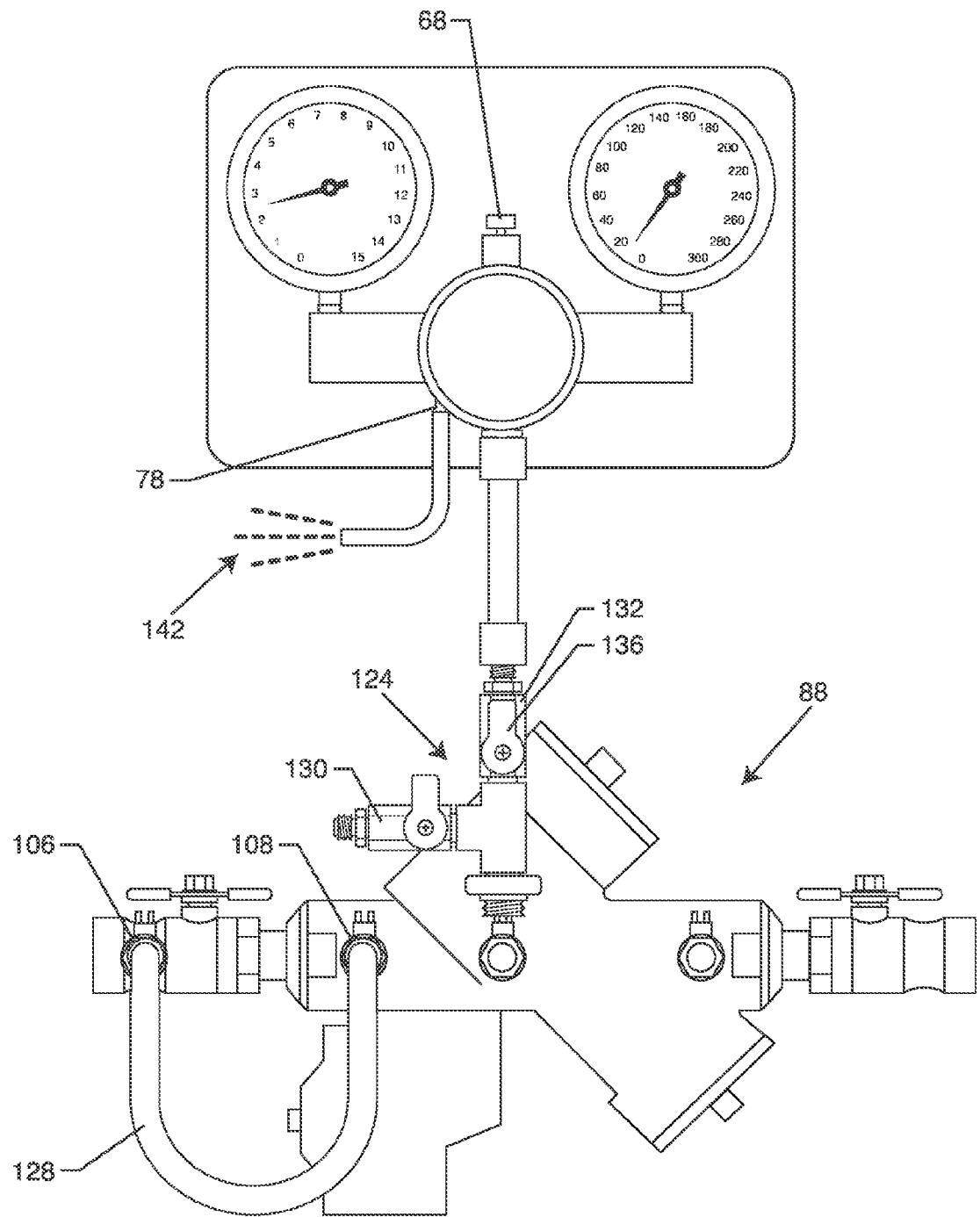
FIG. 30 is a schematic view illustrating connecting the by-pass hose to a second test cock then fully open the bleed valve on the test kit until a slow stream of water leaves the drain on the test kit.
Figure 31:
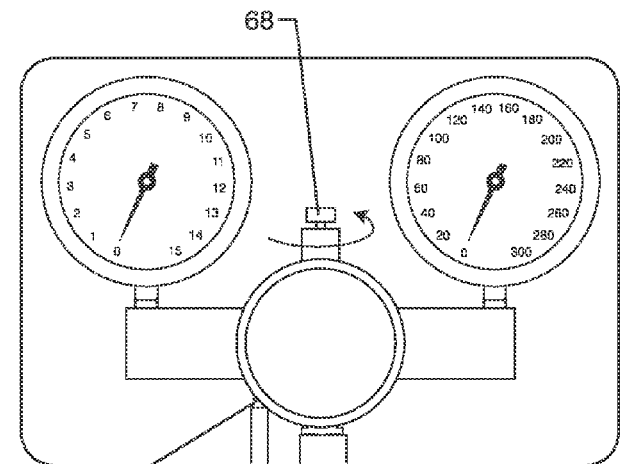
FIG. 31 is a schematic view illustrating establishing the medium drip from the atmospheric drain when slowly re-opening the third test cock after being closed.

Now the test kit 80 is in a position to test the operation of the second check valve 94, in accordance with the embodiments described above. As such, the next step for testing the second check valve 94 in the direction of flow is to disconnect the by-pass hose 128 from the center valve 130 on the two valve tee 124 and reconnect the free end to the second test cock 108, as generally shown in FIG. 30. Next, the needle valve port 68 is rotated to an open bleed position (as described above) to establish the slow stream 142. This, again, ensures hydraulic operation. In this position, both the first test cock 106 and the second test cock 108 should be in the open position. The next step is to open the center valve 130 by moving the valve lever 134 from the position shown in FIG. 25 to the position shown in FIG. 24. The third test cock 110 should then be slowly opened until the slow stream 142 is established from the atmospheric drain 78. Then, the third test cock 110 should be fully closed, followed by slow reopening until the medium flow 144 shown in FIG. 31 is established from the atmospheric drain 78.

Figure 32:
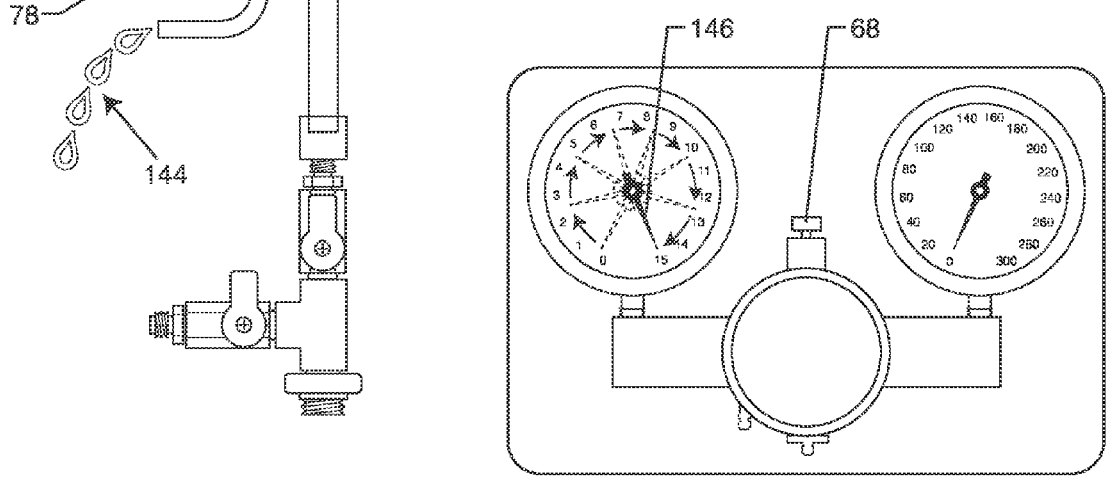
FIG. 32 is a schematic view illustrating closing the needle valve port on the test kit until the low pressure gauge reads 15 PSI.
Figure 33:
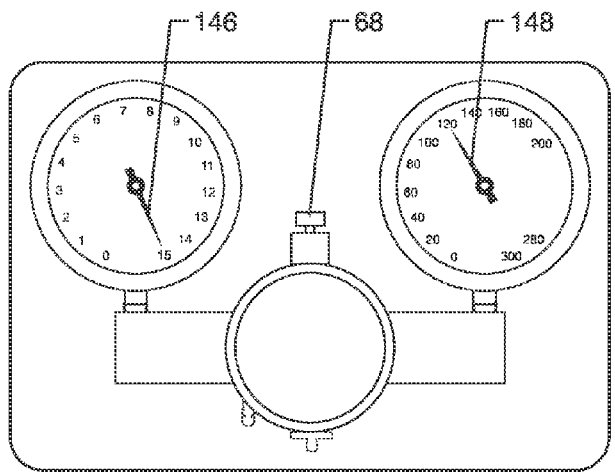
FIG. 33 is a schematic view illustrating successful closure of the needle valve port such that the low pressure gauge reads 15 PSI and the high pressure gauge reads the line pressure of 120 PSI.
Figure 34:
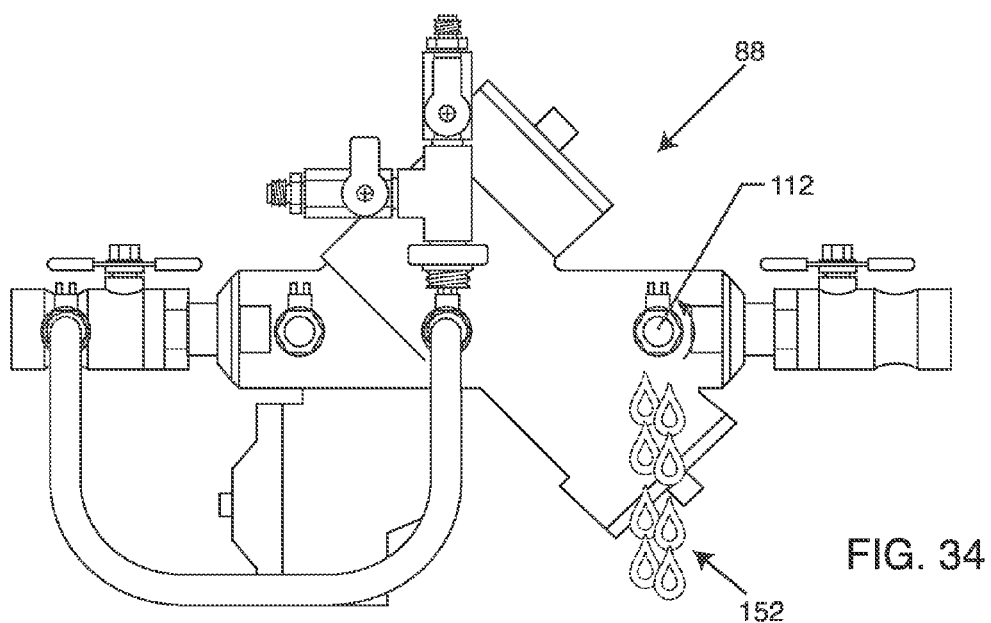
FIG. 34 is a schematic view illustrating opening the fourth test cock until there is a noticeable pressure drop on the high pressure gauge.
Figure 35:
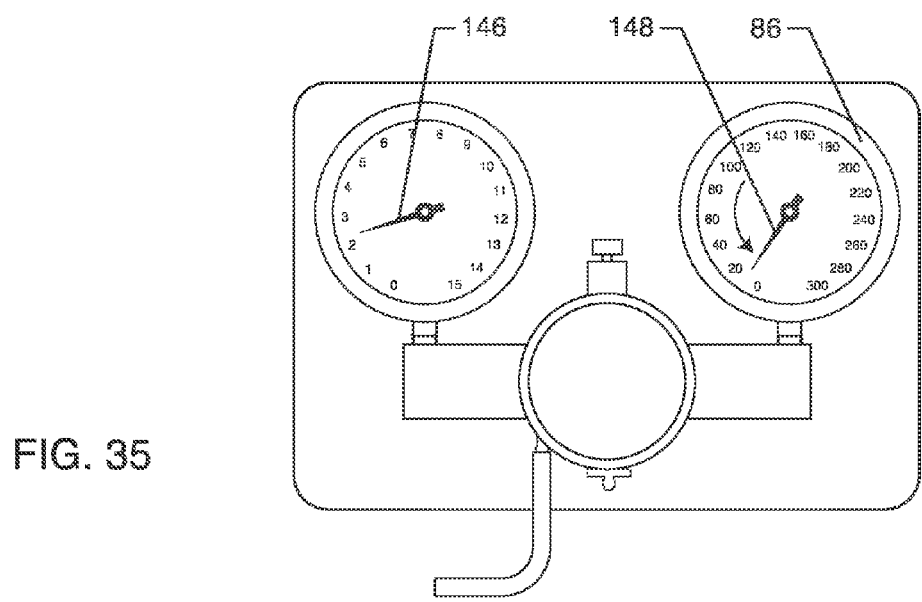
FIG. 35 is a schematic view illustrating reading the static pressure drop across the second check valve indicating a pass or fail reading.
Figure 36:
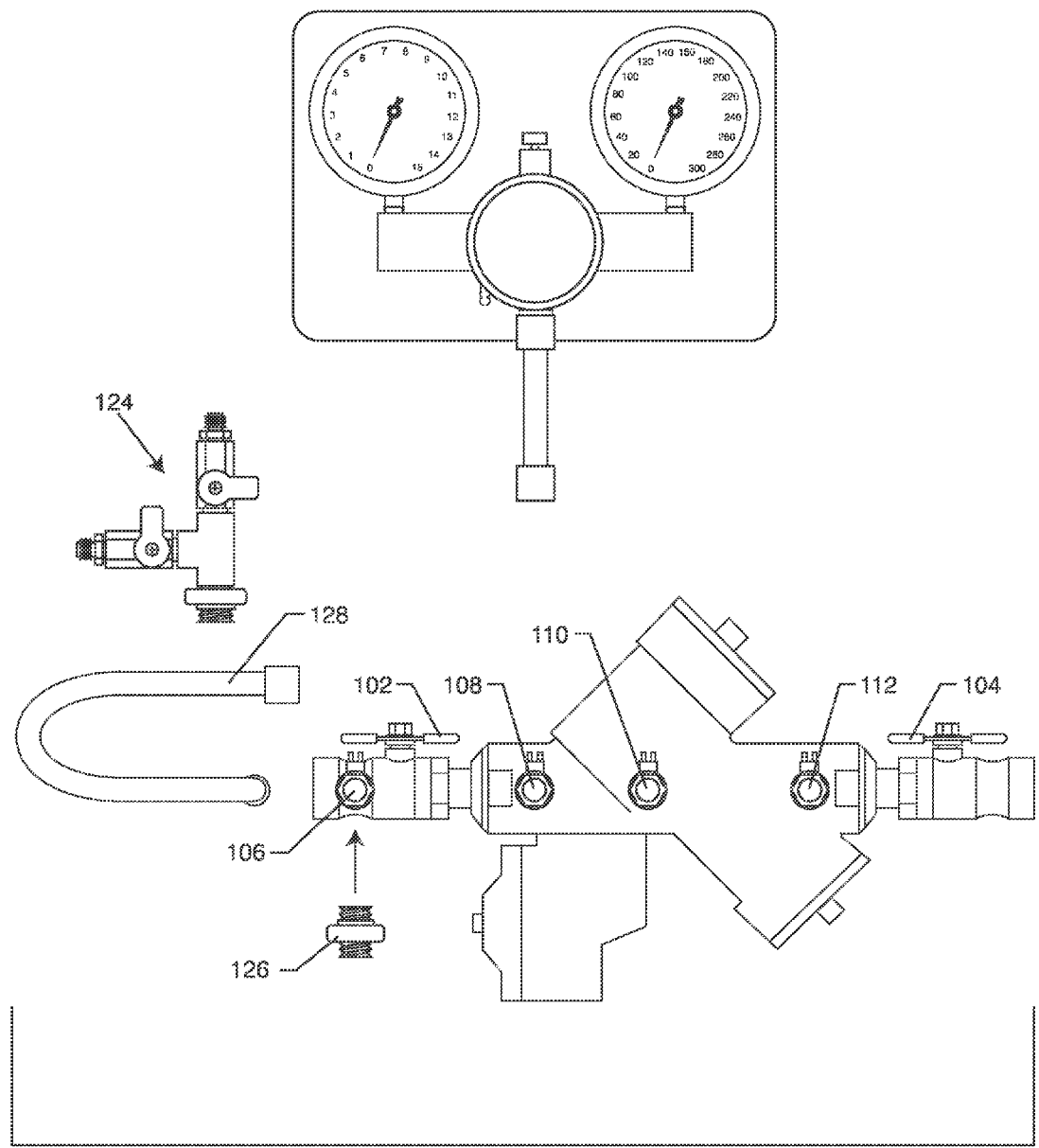
FIG. 36 is a schematic view illustrating disconnection of the testing equipment from backflow preventer and reestablishing water pressure to the system.

The needle valve port 68 on the test kit 80 should then be slowly rotated to a closed position. When this happens, as described above, the low pressure gauge pointer 146 rises to 15 PSI (FIG. 32). Again, if the low pressure gauge pointer 146 stops before reaching 15 PSI, the needle valve port 68 was closed too quickly. If this is the case, the end valve 132 on the two tee valve 124 should be closed so the process can be started over. When the test kit 80 is brought to a point where the low pressure gauge pointer 146 indicates 15 PSI, the needle valve port 68 has been successfully closed. At this point, the high pressure gauge pointer 148 will rise to the point of the line pressure of the backflow preventer 88 (120 PSI), since the end valve 132 is fully open (FIG. 33). The next step is to slowly open the fourth test cock 112 such that the liquid 152 exits therefrom (FIG. 34). At this point, the high pressure gauge pointer 148 on the high pressure gauge 86 will begin dropping as shown in FIG. 35. Additionally, and in accordance with the embodiments described above, the low pressure gauge pointer 146 will likewise drop, as indicated in FIG. 35. In this example, the static pressure drop across the second check valve 94 should be at least 1.0 PSI—thus, FIG. 35 illustrates the low pressure gauge pointer 146 at a PSI rating just above 2.0 PSI. Accordingly, this pressure value should be recorded on a certification report as it indicates that the backflow preventer 88, and specifically the second check valve 94, is operating correctly. If, on the other hand, the low pressure gauge pointer 146 falls below 1.0 PSI, the second check valve 94 failed to sufficiently close and should be recorded as "leaking".

Once finished, all the test cocks 106-112 should be closed and the equipment and adapters (including the two valve tee 124, the quick connect adapter 126, and the by-pass hose 128) should be disconnected. The final step is to re-open the shut-off valves 102, 104 to re-pressurize the backflow preventer 88 and the connected mains water or local water supply. That otherwise concludes the normal procedure for testing a reduced pressure principle backflow prevention assembly (RP) (i.e., the backflow preventer 88 shown and described above) using the one valve method associated with the test kit 80 and the pressure limiting valve 10.

Some considerations that should be borne in mind when using the testing procedure above is that, when servicing a building, the restrooms or other parts of the system should be checked to make sure no valves are stuck open when there was no water pressure. If servicing a fire system, appropriate notification must be made that the fire system is back in operation and may need to be checked.

Although several embodiments have been described in detail for purposes of illustration, various modifications may be made to each without departing from the scope and spirit of the invention. Accordingly, the invention is not to be limited, except as by the appended claims.

What is claimed is:

1. A pressure limiting valve having a first pressure gauge configured to measure the operability of a backflow preventer having a line pressure relatively higher than a maximum PSI rating of the first pressure gauge, the valve comprising:
   a valve body having an inlet configured to statically couple to the backflow preventer and an outlet configured to couple to the first pressure gauge and a second pressure gauge;
   an upper and lower chamber formed from an interior portion of the valve body, the chambers being generally separated by a diaphragm;
   a conduit fluidly coupling the upper and lower chambers;
   a spring actuable via movement of the diaphragm in response to pressure changes in the valve body, wherein the spring generally biases a closure disc in an open position relative to the outlet when the valve body is not under pressure, and compresses under pressure to permit the closure disc to seal the outlet when pressure in the valve body approximately reaches the maximum PSI rating of the first pressure gauge, thereby limiting the maximum pressure deliverable to the first pressure gauge; and
   a fluid control valve to selectively control fluid flow from the lower chamber to a drain.

2. The valve of claim 1, including a diaphragm retainer disposed across at least a portion of a planar surface of the diaphragm and influenced by movement of the spring.

3. The valve of claim 1, wherein the spring comprises a pair of opposing springs disposed across opposite portions of the diaphragm in respective upper and lower chambers, the first spring biasing the closure disc in an open position relative to the outlet and the second spring positioned to oppose open movement of the closure disc by the first spring.

4. The valve of claim 1, including a tensioner coupled to the spring for adjusting the pressure deliverable to the first pressure gauge.

5. The valve of claim 1, wherein the line pressure comprises a hydraulic fluid source.

6. The valve of claim 1, including a vent formed from a cap coupled to the valve body, the vent being fluidly coupled to the upper chamber.

7. The valve of claim 1, wherein the diaphragm comprises a flexible rubber diaphragm.

8. The valve of claim 1, wherein the fluid control valve comprises a needle valve having a displaceable stem to selectively control fluid flow from the lower chamber to the drain.

9. The valve of claim 1, including a relief valve in fluid communication with the first pressure gauge and having a release point approximately the same as the maximum PSI rating of the first pressure gauge.

10. The valve of claim 1, wherein the valve body selectively mounts to a portable backboard.

11. The valve of claim 1, including a seat positioned near the outlet and tapering downwardly away from the diaphragm to permit deflection of the closure disc thereover.

12. The valve of claim 11, including a stem biased between the spring and a diaphragm retainer and extending into a vertical passageway at least partially circumscribed by the seat.

13. The valve of claim 1, including a high second pressure gauge in fluid communication with the inlet for measuring the line pressure.

14. The valve of claim 13, wherein the valve body includes a pair of oppositely extending arms, the first arm for carrying relatively high pressure fluid to the second pressure gauge, and the second arm for carrying relatively low pressure fluid through the outlet to the first pressure gauge.

15. A pressure limiting valve having a first pressure gauge configured to measure the operability of a backflow preventer having a line pressure relatively higher than a maximum PSI rating of the first pressure gauge, the valve comprising:
a valve body having an inlet configured to statically couple to the backflow preventer and an outlet configured to couple to the first pressure gauge and a second pressure gauge;
an upper and lower chamber formed from an interior portion of the valve body and separated by a diaphragm;
a conduit fluidly coupling the upper and lower chambers;
a pair of opposing springs disposed across opposite portions of the flexible diaphragm in respective upper and lower chambers and actuable via movement of the flexible diaphragm in response to pressure changes in the valve body, wherein when the valve body is not under pressure the first spring biases a closure disc to an open position relative to the outlet and the second spring opposes such open movement of the closure disc by the first spring, and
wherein when the valve is under pressure approximately equal to the maximum PSI rating of the first pressure gauge, the first spring compresses to permit the closure disc to seal the outlet, thereby limiting the maximum pressure deliverable to the first pressure gauge;
a seat positioned near the outlet and tapering downwardly away from the diaphragm to permit deflection of the closure disc thereover;
a diaphragm retainer disposed across at least a portion of a planar surface of the diaphragm and influenced by movement of the first and second springs; and
a fluid control valve to selectively control fluid flow from the lower chamber to a drain.

16. The valve of claim 15, including a stem biased between the first spring and the diaphragm retainer and extending into a vertical passageway at least partially circumscribed by the seat.

17. The valve of claim 15, wherein the valve body includes a pair of oppositely extending arms, the first arm for carrying relatively high pressure fluid to the second pressure gauge from the line pressure comprising a hydraulic fluid source, and the second arm for carrying relatively low pressure fluid through the outlet to the first pressure gauge.

18. The valve of claim 15, including a tensioner coupled to the first spring for adjusting the maximum pressure deliverable to the first pressure gauge and a vent formed from the valve body and fluidly coupled to the upper chamber.

19. The valve of claim 15, wherein the fluid control valve comprises a needle valve having a movable stem to selectively control fluid flow from the lower chamber to the drain.

20. The valve of claim 15, including a relief valve fluidly coupled to the first pressure gauge and having a release point approximately the same as the maximum PSI rating of the first pressure gauge.

21. The valve of claim 15, including a second pressure gauge coupled to the inlet for measuring the line pressure.

22. A pressure limiting valve, comprising:
a valve body having an inlet configured to statically couple to a hydraulic fluid source;
an upper and lower chamber formed from an interior portion of the valve body, the chambers being separated by a diaphragm;
a conduit fluidly coupling the upper and lower chambers;
a spring actuable via movement of the flexible diaphragm in response to pressure changes in the valve body, the spring positioned to bias a closure disc in an open position relative to an outlet when the valve body is not under pressure, and configured to compress under pressure to permit the closure disc to seal the outlet when pressure in the valve body reaches a closure pressure, thereby limiting the maximum pressure deliverable to the outlet; and
a fluid control valve to selectively control fluid flow from the lower chamber to a drain.

23. The valve of claim 22, including a diaphragm retainer disposed across at least a portion of a planar surface of the diaphragm and influenced by movement of the spring.

24. The valve of claim 22, wherein the spring comprises a pair of opposing springs disposed across opposite portions of the flexible diaphragm in respective upper and lower chambers, the first spring biasing the closure disc in an open position relative to the outlet and the second spring positioned to oppose open movement of the closure disc by the first spring.

25. The valve of claim 22, including a tensioner coupled to the spring for adjusting the pressure deliverable to the outlet and a vent formed from a cap coupled to the valve body.

26. The valve of claim 22, wherein the diaphragm comprises a flexible rubber diaphragm.

27. The valve of claim 22, including a seat positioned near the outlet and tapering downwardly away from the diaphragm to permit deflection of the closure disc thereover.

28. The valve of claim 27, including a stem biased between the spring and a diaphragm retainer and extending into a vertical passageway at least partially circumscribed by the seat.

* * * * *